US012694434B2

(12) United States Patent
Docherty et al.

(10) Patent No.: US 12,694,434 B2
(45) Date of Patent: *Jul. 28, 2026

(54) SYSTEMS AND METHODS FOR GENERATING ALTERNATIVE CONTENT RECOMMENDATIONS

(71) Applicant: ThinkAnalytics Ltd., Glasgow (GB)

(72) Inventors: Peter Docherty, Glasgow (GB);
Christopher McGuire, Glasgow (GB);
Adam Fleming, Singapore (SG);
Harrison Ghatoray, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 305 days.

This patent is subject to a terminal disclaimer.

(21) Appl. No.: 18/130,896

(22) Filed: Apr. 4, 2023

(65) Prior Publication Data

US 2024/0338743 A1     Oct. 10, 2024

(51) Int. Cl.
*G06Q 30/00* (2023.01)
*G06F 16/438* (2019.01)
*G06Q 30/0601* (2023.01)

(52) U.S. Cl.
CPC ....... *G06Q 30/0631* (2013.01); *G06F 16/438* (2019.01)

(58) Field of Classification Search
CPC ............................................... G06Q 30/06–08
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |
| 9,699,491 B1 | 7/2017 | Docherty et al. |

(Continued)

FOREIGN PATENT DOCUMENTS

| | | |
|---|---|---|
| EP | 1 317 143 | 6/2003 |
| EP | 2 207 348 | 7/2010 |

(Continued)

OTHER PUBLICATIONS

Chaudhari, Anagha, "A Comprehensive Study on Recommendation Engines", 2022 6th Conf. on Computing, Communication, Control and Automation, 978-1-6654-8451 (Year: 2022).*

(Continued)

*Primary Examiner* — Ethan D Civan
(74) *Attorney, Agent, or Firm* — Foley & Lardner LLP

(57) ABSTRACT

A computer-implemented method for obtaining one or more recommendation candidates for items of content available via a content distribution system, the method comprising: obtaining user data for a selected user, wherein the user data comprise or represent user activity and/or content metadata associated with user activity; generating or otherwise obtaining relationship information for at least some content metadata associated with the available content; generating further user data from the user data using the relationship information so that the further user data comprises or represents alternative content metadata that are distinct or at most overlap with the content metadata associated with the user activity; performing a content recommendation process using at least the further user data and content information for the available content to generate one or more content recommendation candidates for the user.

18 Claims, 12 Drawing Sheets

(56) References Cited

U.S. PATENT DOCUMENTS

| | | | |
|---|---|---|---|
| 9,756,390 | B1 | 9/2017 | Docherty et al. |
| 9,906,837 | B1 | 2/2018 | Docherty et al. |
| 9,973,797 | B1 | 5/2018 | Docherty et al. |
| 10,091,555 | B1 | 10/2018 | Docherty et al. |
| 10,289,739 | B1 | 5/2019 | Docherty et al. |
| 10,356,035 | B1 | 7/2019 | Gravino et al. |
| 10,412,454 | B2 | 9/2019 | Docherty et al. |
| 11,004,135 | B1 | 5/2021 | Sandler et al. |
| 11,212,584 | B2 | 12/2021 | Docherty et al. |
| 11,343,573 | B2 | 5/2022 | Docherty et al. |
| 2003/0106064 | A1 | 6/2003 | Plourde |
| 2007/0157222 | A1 | 7/2007 | Cordray et al. |
| 2008/0304812 | A1 | 12/2008 | Jin |
| 2009/0271826 | A1* | 10/2009 | Lee .................... H04N 21/4826 |
| | | | 725/46 |
| 2010/0005492 | A1 | 1/2010 | Takano et al. |
| 2010/0070507 | A1 | 3/2010 | Mori |
| 2011/0243529 | A1 | 10/2011 | Oryoji et al. |
| 2013/0086082 | A1* | 4/2013 | Park .................... G06F 16/9535 |
| | | | 707/748 |
| 2014/0149344 | A1 | 5/2014 | Pudipeddi et al. |
| 2014/0279756 | A1 | 9/2014 | Whitman |
| 2015/0082330 | A1 | 3/2015 | Yun et al. |
| 2015/0100987 | A1 | 4/2015 | Whitman et al. |
| 2015/0269488 | A1 | 9/2015 | Galai et al. |
| 2016/0147767 | A1 | 5/2016 | Manning et al. |
| 2016/0196580 | A1* | 7/2016 | Hong ................. G06Q 30/0269 |
| | | | 705/14.53 |
| 2016/0299906 | A1 | 10/2016 | Cartoon et al. |
| 2017/0311015 | A1 | 10/2017 | Docherty et al. |
| 2019/0364338 | A1 | 11/2019 | Docherty et al. |
| 2020/0193552 | A1* | 6/2020 | Turkelson ......... G06F 18/24143 |
| 2020/0252690 | A1 | 8/2020 | Docherty et al. |
| 2020/0409983 | A1 | 12/2020 | Miller |
| 2021/0406736 | A1 | 12/2021 | Sennik et al. |
| 2023/0162033 | A1 | 5/2023 | Kadam |
| 2023/0418872 | A1 | 12/2023 | Lamere et al. |
| 2024/0242106 | A1* | 7/2024 | Shamir .............. G06Q 30/0282 |
| 2024/0257214 | A1 | 8/2024 | Vashishtha et al. |
| 2024/0340480 | A1* | 10/2024 | Docherty ......... H04N 21/25891 |

FOREIGN PATENT DOCUMENTS

| | | |
|---|---|---|
| WO | WO-01/15449 | 3/2001 |
| WO | WO-02/27526 | 4/2002 |
| WO | WO-2008/042242 | 4/2008 |
| WO | WO-2013/186061 | 12/2013 |
| WO | WO-2021/3130834 | 7/2021 |

OTHER PUBLICATIONS

Chaudhari, Anagha, "A Comprehensive Study on Recommendation Engines", 2022 6th Conf. on Computing, Communication, Control and Automation, 978𠅁�� (Year: 2022).

* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Fig. 2

402 — obtaining user data for a selected user

404 — obtaining relationship information associated with the user data

406 — generating further user data from the user data using the relationship information 408 — performing a content recommendation process using at least the further user data and content information for the available content 502 — Obtaining user data 504 — Performing content recommendation 506 — Obtaining relationship information 508 — Using relationship information to generate further recommendation candidates

Fig. 9

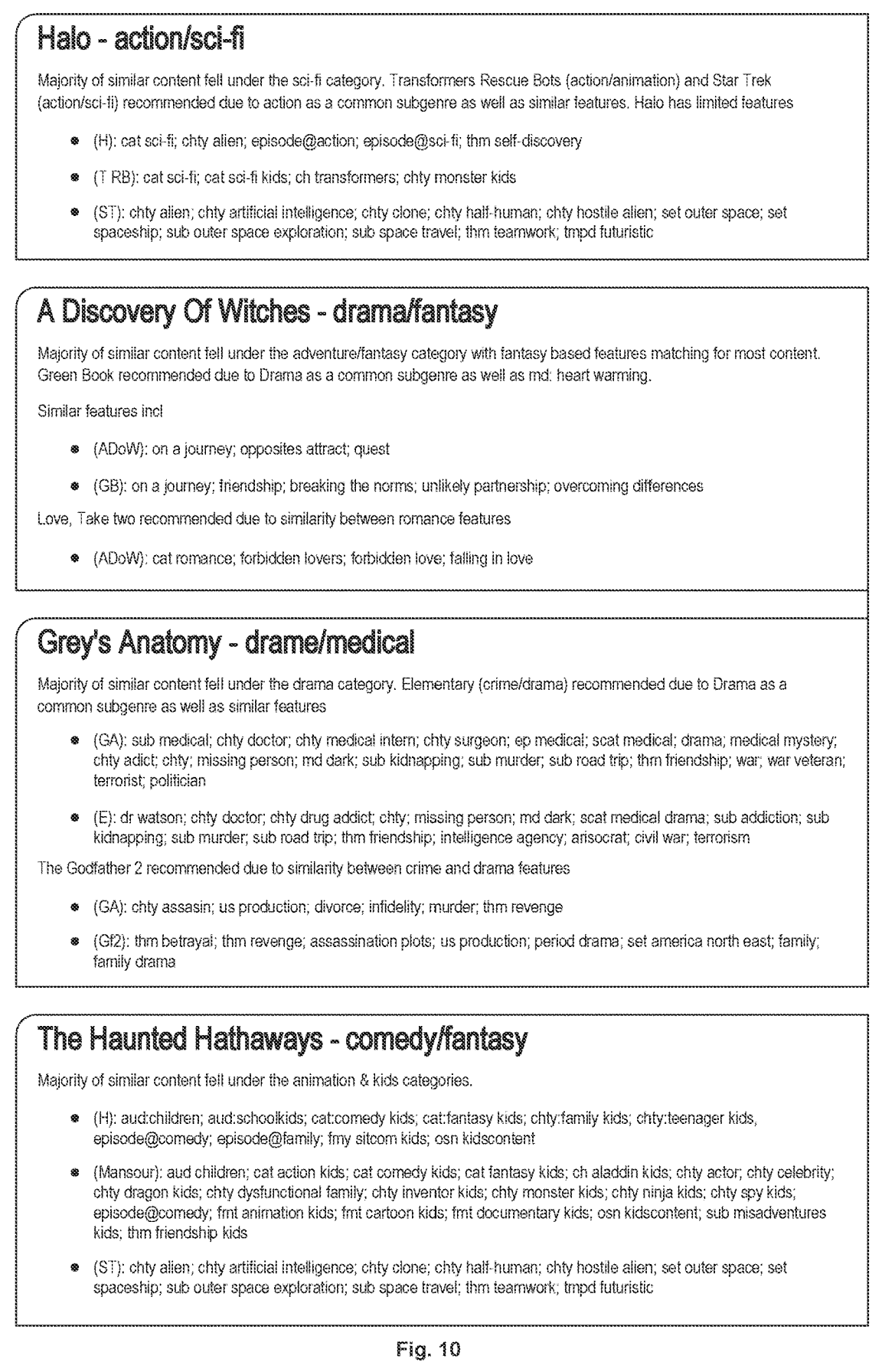

Halo - action/sci-fi

Majority of similar content fell under the sci-fi category. Transformers Rescue Bots (action/animation) and Star Trek (action/sci-fi) recommended due to action as a common subgenre as well as similar features. Halo has limited features

- (H): cat sci-fi; chty alien; episode@action; episode@sci-fi; thm self-discovery

- (T RB): cat sci-fi; cat sci-fi kids; ch transformers; chty monster kids

- (ST): chty alien; chty artificial intelligence; chty clone; chty half-human; chty hostile alien; set outer space; set spaceship; sub outer space exploration; sub space travel; thm teamwork; tmpd futuristic

A Discovery Of Witches - drama/fantasy

Majority of similar content fell under the adventure/fantasy category with fantasy based features matching for most content. Green Book recommended due to Drama as a common subgenre as well as md: heart warming.

Similar features incl

- (ADoW): on a journey; opposites attract; quest

- (GB): on a journey; friendship; breaking the norms; unlikely partnership; overcoming differences Love, Take two recommended due to similarity between romance features

- (ADoW): cat romance; forbidden lovers; forbidden love; falling in love

Grey's Anatomy - drame/medical

Majority of similar content fell under the drama category. Elementary (crime/drama) recommended due to Drama as a common subgenre as well as similar features

- (GA): sub medical; chty doctor; chty medical intern; chty surgeon; ep medical; scat medical; drama; medical mystery; chty adict; chty; missing person; md dark; sub kidnapping; sub murder; sub road trip; thm friendship; war; war veteran; terrorist; politician

- (E): dr watson; chty doctor; chty drug addict; chty; missing person; md dark; scat medical drama; sub addiction; sub kidnapping; sub murder; sub road trip; thm friendship; intelligence agency; arisocrat; civil war; terrorism The Godfather 2 recommended due to similarity between crime and drama features

- (GA): chty assasin; us production; divorce; infidelity; murder; thm revenge

- (Gf2): thm betrayal; thm revenge; assassination plots; us production; period drama; set america north east; family; family drama

The Haunted Hathaways - comedy/fantasy

Majority of similar content fell under the animation & kids categories.

- (H): aud:children; aud:schoolkids; cat:comedy kids; cat:fantasy kids; chty:family kids; chty:teenager kids, episode@comedy; episode@family; fmy sitcom kids; osn kidscontent

- (Mansour): aud children; cat action kids; cat comedy kids; cat fantasy kids; ch aladdin kids; chty actor; chty celebrity; chty dragon kids; chty dysfunctional family; chty inventor kids; chty monster kids; chty ninja kids; chty spy kids; episode@comedy; fmt animation kids; fmt cartoon kids; fmt documentary kids; osn kidscontent; sub misadventures kids; thm friendship kids

- (ST): chty alien; chty artificial intelligence; chty clone; chty half-human; chty hostile alien; set outer space; set spaceship; sub outer space exploration; sub space travel; thm teamwork; tmpd futuristic

Fig. 10

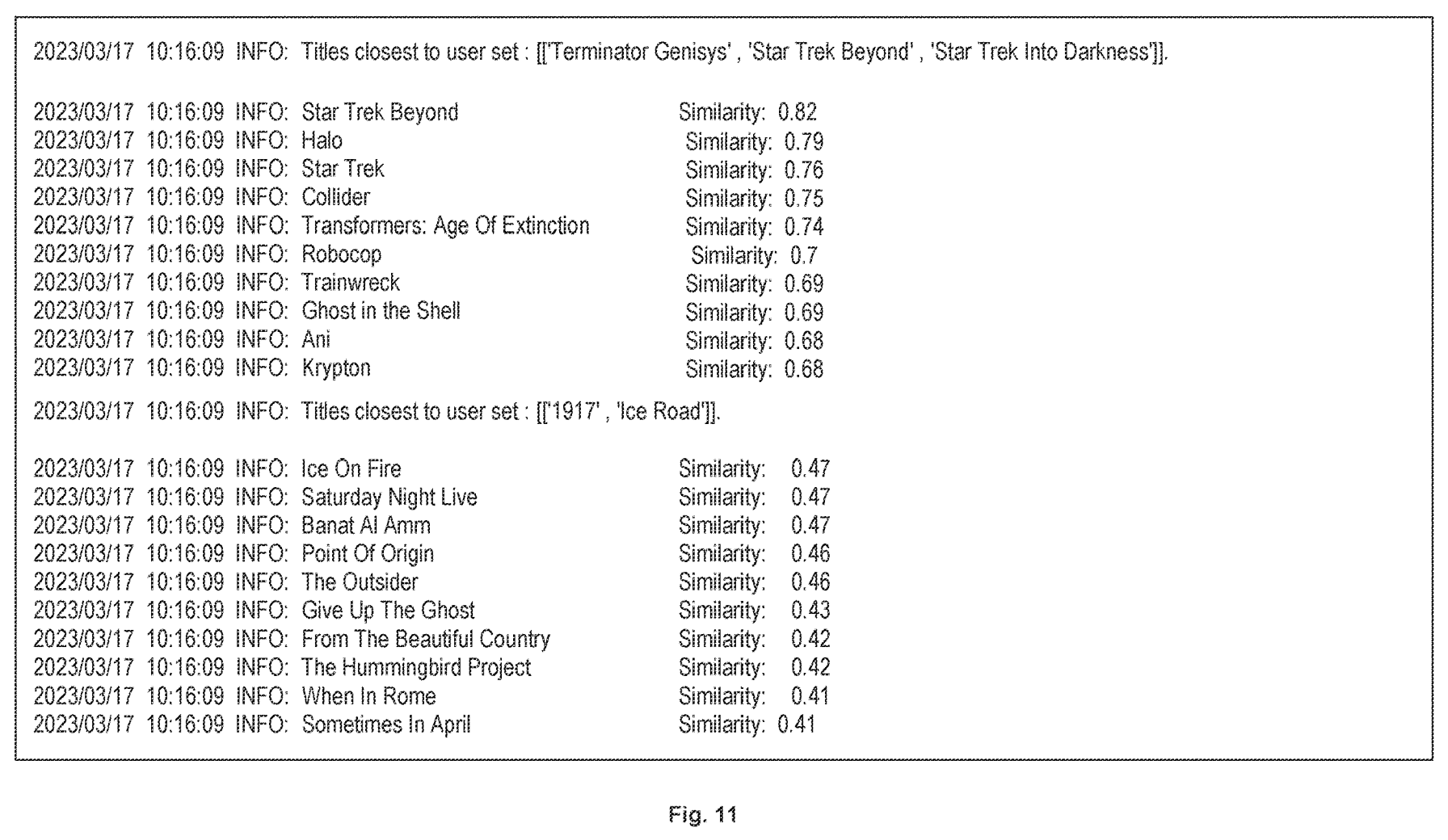

```
2023/03/17 10:16:09 INFO:  Titles closest to user set : [['Terminator Genisys' , 'Star Trek Beyond' , 'Star Trek Into Darkness']].

2023/03/17 10:16:09 INFO:  Star Trek Beyond                    Similarity:  0.82
2023/03/17 10:16:09 INFO:  Halo                                Similarity:  0.79
2023/03/17 10:16:09 INFO:  Star Trek                           Similarity:  0.76
2023/03/17 10:16:09 INFO:  Collider                            Similarity:  0.75
2023/03/17 10:16:09 INFO:  Transformers: Age Of Extinction     Similarity:  0.74
2023/03/17 10:16:09 INFO:  Robocop                             Similarity:  0.7
2023/03/17 10:16:09 INFO:  Trainwreck                          Similarity:  0.69
2023/03/17 10:16:09 INFO:  Ghost in the Shell                  Similarity:  0.69
2023/03/17 10:16:09 INFO:  Ani                                 Similarity:  0.68
2023/03/17 10:16:09 INFO:  Krypton                             Similarity:  0.68

2023/03/17 10:16:09 INFO:  Titles closest to user set : [['1917', 'Ice Road']].

2023/03/17 10:16:09 INFO:  Ice On Fire                         Similarity:  0.47
2023/03/17 10:16:09 INFO:  Saturday Night Live                 Similarity:  0.47
2023/03/17 10:16:09 INFO:  Banat Al Amm                        Similarity:  0.47
2023/03/17 10:16:09 INFO:  Point Of Origin                     Similarity:  0.46
2023/03/17 10:16:09 INFO:  The Outsider                        Similarity:  0.46
2023/03/17 10:16:09 INFO:  Give Up The Ghost                   Similarity:  0.43
2023/03/17 10:16:09 INFO:  From The Beautiful Country          Similarity:  0.42
2023/03/17 10:16:09 INFO:  The Hummingbird Project             Similarity:  0.42
2023/03/17 10:16:09 INFO:  When In Rome                        Similarity:  0.41
2023/03/17 10:16:09 INFO:  Sometimes In April                  Similarity:  0.41
```

Fig. 11

SYSTEMS AND METHODS FOR GENERATING ALTERNATIVE CONTENT RECOMMENDATIONS

FIELD

The present disclosure relates generally to a content recommendation system and method, in particular a method and system for generating alternative, or diverse, set of content recommendation candidates.

BACKGROUND

Developments in technology mean that users are able to access content via a wide array of different mechanisms, and via a wide array of different sources. For example, television channels, radio stations, video-on-demand and other streaming services, social media and other internet content sources provide a vast array of content available to a user. In some systems, it may be required to apply additional constraints on any recommendations, for example, constraints relating to commercial, business and/or legal factors.

In this context, during a viewing session, a viewer is faced with a very large choice of what to watch from a wide range of available content sources. Faced with such a large choice a viewer may view or otherwise consume content they are already familiar with rather than try something new. In general, it is known that content that offers the best match to a user profile may not be diverse. In addition, relying on past viewing history to recommend content for a user may lead to the user being recommended a narrowing field of more specialized content. It is desirable to target users with different content, or to make particular content available to particular users.

In addition, promoting discovery by applying additional constraints may offer little to no control at the level of the request, as well as potentially causing conflicts with efforts to personalize results. It has been found that the performance impact of applying additional constraints during a content recommendation request has been found to be large when attempting to find well-distributed/diverse content When addressing the problem of providing diverse content recommendations, a number of technical challenges and considerations must be addressed.

SUMMARY

In accordance with a first aspect, there is provided a computer-implemented method for obtaining one or more recommendation candidates for items of content available via a content distribution system, the method comprising: obtaining user data for a selected user, wherein the user data comprise or represent user activity and/or content metadata associated with user activity; generating or otherwise obtaining relationship information for at least some content metadata associated with the available content; generating further user data from the user data using the relationship information so that the further user data comprises or represents alternative content metadata that are distinct or at most overlap with the content metadata associated with the user activity; performing a content recommendation process using at least the further user data and content information for the available content to generate one or more content recommendation candidates for the user. The relationship information may be based on at least content engagement data for a plurality of users of the content distribution system.

The content metadata may comprises one or more properties obtained or selected from a predetermined set of properties. The relationship information may comprise information about relationships between said predetermined set of properties, for example, between one or more properties of the predetermined set of properties. The alternative content metadata may comprise one or more alternative properties obtained and/or selected from the predetermined set of properties.

The content information may comprise content metadata. The content information may comprise one or more properties selected from the predetermined set of properties. The at least one property of the piece of content may comprise a set of tags or other metadata representing properties of an item of content.

The generated one or more candidates may correspond to a set of candidates and may be compared to a reference set of candidates generated using the user data. The generated set of candidates may match with the user data to a lesser degree than the reference set. The generated set of candidates has more metadata or metadata items that are not associated with the user activity than the reference set. The metadata that are common between the generated set and the reference set of candidates may have a lower associated weight for the generated set than for the reference set.

The generated set of one or more candidates may comprise or correspond to a diverse set of recommendation candidates. The reference one or more candidates may comprise or correspond to a non-diverse set of recommendation candidates.

The recommendation process may comprise identifying content that has content information representing similar or matched metadata compared to the further user data. The recommendation process may comprise performing a content candidate selection process comprising selecting content candidates based on a comparison between the metadata associated with the available content and the alternative metadata.

The method may further comprise monitoring user activity including identifying content selected for viewing by the user of the user device and generating or updating the user data using metadata associated with the selected content wherein the content metadata of the user data is associated with selected items, and wherein the alternative content metadata is obtaining using relationship information.

The alternative content metadata may be associated and/or may represent content that has not been selected by the user and/or content that has been selected by other users.

The one or more properties may comprise content parameters, properties and/or characteristics, such as programme title, time, duration, content type, programme categorisation, actor names, genre, release data, episode number, series number, style, mood, language and theme.

The content metadata may be selected from a predetermined set of properties that comprises a stored ontology that includes at least 10,000 features that can be used as meta data to represent items of content. The ontology may include enriched versions of metadata obtained for items of content.

The relationship information may include distance and/or separation information for the content metadata associated with the available content. The method may comprise selecting a desired degree of distance or separation and generating the further user data based on the desired degree of distance or separation.

The relationship information may comprise distance or separation information between one or more properties of the predetermined set of properties The one or more properties and/or parameters may be represented by discrete items and the relationship information may be represented by a network of said discrete items. The network may comprise separation information. The method may selecting a desired degree of separation when using the relationship information.

The plurality of properties associated with the content may be represented as a plurality of discrete items and/or associated weightings, wherein the plurality of discrete items are obtained from a larger set of discrete items, and wherein the relationship information corresponds to a set of pre-determined relationships between the set of discrete items.

The user data may be stored as a user record or a user profile. The content metadata may be represented as a discrete graph and/or as a feature vector.

The user data may represent or be indicative of user preferences and/or user interests associated with and/or derived based on user activity and wherein the generated further user data is representative of user interests and/or preferences that are different to or at most overlap with the one or more selected user interests and/or preferences.

The user interest and/or preferences may be represented by metadata and/or their associated weights for content with which a user has previously selected and/or engaged.

The user data may form part of a user record which may be used in generating personal content recommendations for the user.

The user data may comprises or be based on user action data representing previous user actions, optionally content selection, viewing or recording actions, user language data and/or episode data and/or rating data and/or content metadata representing properties of content viewed, recorded or selected by a user. The relationship information may be obtained from collaborative data.

The content recommendation candidates may be different to or at most overlap with one of more content recommendation candidates that would be obtained by performing the content recommendation process without using the relationship information, for example, by performing the recommendation process using the initial user data and/or performing the content recommendation process without first using the relationship information.

The relationship information may be represented as and/or form part of a first machine learning model. The content recommendation request may be represented or form part of a second machine learning model. The method may comprise applying the first machine learning model to at least part of the user data to generate the further user data applying the second machine learning model to the further user data to generate the plurality of content recommendation candidates. The relationship information may be derived using an embedding based learning procedure. The relationship information may be captured during training of a neural network.

Generating the further user data using the relationship information may comprise applying a mapping to the one or more properties associated with the content, wherein the mapping is based on content engagement data for a plurality of users. The mapping may comprise a machine learning derive procedure.

The user data may be stored in a user profile and the content recommendation process may be configured to generate recommendation candidates based on the user profile, wherein generating the further user data further comprise performing a user profile expansion and/or modification process on the user profile using the relationship information to generate an expanded user profile using at least the alternative content metadata and wherein the method comprises using the expanded user profile to generate the content item recommendation.

The user profile expansion and/or modification process may comprise adding and/or removing metadata using the relationship information.

The recommendation process may be based on a combination of the user data and the further user data and wherein the method comprises controlling a weighting between the user data and the further user data for the recommendation process.

The relationship information may comprise learned relationships between a set of predetermined categories in the user data. The relationship information may comprise learned relationships between metadata terms selected from a set and/or generated from an ontology of metadata terms.

The content engagement data may comprise interaction data representing interactions between the plurality of users and the available content items. The content engagement data may represent or be determine from user actions in relation to the available content.

The method may further comprises opening a content recommendation session in which one or more content recommendation procedures or operations are available to be applied to user data to generate content recommendation candidates. The content recommendation process may comprise applying the one or more content recommendation operations to the generated further user data and wherein applying the one or more content recommendation operations to the user data would generate an alternate set of recommendation candidates that is different to the set of generated one or more content recommendation candidates for the user. The method may comprise applying the one or more content recommendation procedures or operations to the further user data The content recommendation process may be further dependent on a parameter indicative of a desired degree of diversity for the generated one or more content recommendation candidates for the user relative to one or content recommendation candidates generated using the user data.

Performing the content recommendation operation may comprise receiving a request over a network for one or more recommendation candidates and sending the generated one or more recommendation candidates as a response over a network, wherein the request and response are received and sent using an predefined application programming interface.

The method may comprise providing the content recommendation candidates to a user device configured to provide content to the user.

The method may comprise monitoring user activity including identifying content that the user of the user device has interacted with and adding content item identifiers, for the identified content, to the user data. The content may comprise one or more of: television content; movies; videos; games; books; or music.

The user data may be based on user actions. The user actions may be one or more of: selecting, viewing, purchasing, recording, reading, listening to, playing, sharing, rating, commenting on or otherwise interacting with content.

In accordance with a second aspect there is provided a system comprising processing circuitry configured to: obtain user data for a selected user, wherein the user data comprise or represent user activity and/or content metadata associated with user activity; generate or otherwise obtaining relationship information for at least some content metadata associated with the available content, wherein the relationship information is based on at least content engagement data for a plurality of users of the content distribution system; generate further user data from the user data using the relationship information so that the further user data comprises or represents alternative content metadata that are distinct or at most overlap with the content metadata associated with the user activity; perform a content recommendation process using at least the further user data and content information for the available content to generate one or more content recommendation candidates for the user.

In accordance with a third aspect there is provided, a non-transitory computer-readable medium that comprises computer-readable instructions that are executable to perform a method for obtaining one or more recommendation candidates for items of content available via a content distribution system, the method comprising: obtaining user data for a selected user, wherein the user data comprise or represent user activity and/or content metadata associated with user activity; generating or otherwise obtaining relationship information for at least some content metadata associated with the available content, wherein the relationship information is based on at least content engagement data for a plurality of users of the content distribution system; generating further user data from the user data using the relationship information so that the further user data comprises or represents alternative content metadata that are distinct or at most overlap with the content metadata associated with the user activity; performing a content recommendation process using at least the further user data and content information for the available content to generate one or more content recommendation candidates for the user.

In accordance with a fourth aspect there is provided a computer-implemented method for obtaining one or more recommendation candidates for items of content available via a content distribution system, the method comprising:

obtaining user data for a selected user, wherein the user data comprise or represent content metadata associated with user activity;

performing a content recommendation process using the user data and content information for the available content to generate one or more initial content recommendation candidates for the user;

generating or otherwise obtaining relationship information for the available content items and/or metadata associated with the available content items wherein the relationship information is based on at least content engagement data for a plurality of users of the content distribution system;

generating one or more further content recommendation candidates from the initial content recommendation candidates using the relationship information.

The further one or more candidates may match with the user data to a lesser degree than the initial one or more candidates. The further one or more candidates may have more metadata or metadata items that are not associated with the user activity than the initial one or more candidates. The metadata that are common between the further one or more candidates and the initial one or more candidates may have a lower associated weight for the further one or more candidates than for the initial one or more candidates.

The further one or more candidates may comprise or correspond to a diverse set of recommendation candidates. The initial one or more candidates may comprise or correspond to a non-diverse set of recommendation candidates.

The further set may comprise or correspond to a diverse set. The initial set may comprise or correspond to a non-diverse set.

The one or more further content recommendation candidate candidates may be different and/or at most overlap with the one or more initial content recommendation candidates generated using the user data.

The relationship information may comprise learned relationships between one or more content items and/or metadata associated with the content items.

Generating the one or more further content recommendation candidates using relationship information may comprise applying a mapping from the one or more initial content recommendation candidates to the one or more further content recommendation candidates.

The user data and/or the content information may represent one or more properties comprise content parameters, properties and/or characteristics, such as programme title, time, duration, content type, programme categorisation, actor names, genre, release data, episode number, series number, style, mood, language and theme Generating the further content recommendation process may be subject to one or more constraints such that the one or more further recommendation candidates comprise at least one candidate that has at least one property substantially different to content the user has previously engaged with.

The content information may comprise content metadata. The content metadata may comprise one or more properties obtained from or selected from a predetermined set of properties.

The relationship information may comprise information about relationships between content items of the available content items. The relationship information may comprise information about metadata associated with the available content items. The relationship information may comprise information about relationships between said predetermined set of properties. The content information may comprise one or more properties selected from the predetermined set of properties. The at least one property of the piece of content may comprise a set of tags or other metadata representing properties of the piece of additional content.

The recommendation process may comprise a process of identifying content that has content information representing similar or matched metadata compared to user data.

The method may comprise monitoring user activity including identifying content selected for viewing by the user of the user device and generating or updating the user data using metadata associated with the selected content.

The content information and/or user data may represent and/or be indicative of metadata selected from a predetermined set of properties that comprises a stored ontology that includes at least 10,000 features that can be used as meta data to represent items of content, optionally wherein the ontology includes enriched versions of metadata obtained for items of content.

The relationship information may include distance and/or separation information for the available content items and/or content metadata associated with the available content, and wherein the method comprises selecting a desired degree of distance or separation and generating the further content recommendation candidates based on the desired degree of distance or separation.

The relationship information may comprise distance and/or separation information between the content items.

The content items and/or associated metadata may be represented by discrete items and the relationship information is represented by a network between said discrete items, wherein the network comprises separation information, wherein the method comprises selecting a desired degree of separation when using the relationship information to generate the further recommendation candidates.

The content items and/or the plurality of properties associated with the content may be represented as a plurality of discrete items and/or associated weightings, wherein the plurality of discrete items are obtained from a larger set of discrete items, and wherein the relationship information corresponds to a set of pre-determined relationships between the set of discrete items.

The user data may be stored as a user record or a user profile. The content metadata may be represented as a discrete graph and/or as a feature vector. The user data may forms part of a user record which may be used in generating personal content recommendations for the user.

The user data may comprise or be based on user action data representing previous user actions, optionally content selection, viewing or recording actions, user language data and/or episode data and/or rating data and/or content metadata representing properties of content viewed, recorded or selected by a user.

The further content recommendation candidates may be different to or at most overlap with the initial content recommendation candidates.

The relationship information may comprise information on at least one relationship between the one or more content items and/or items of the associated metadata The relationship information may be represented as and/or form part of a first machine learning model and the content recommendation request is represented as and/or forms part of a second machine learning model such that the method comprises applying the second machine learning model to at least part of the user data to generate the initial set of recommendation candidates; applying the second machine learning model to at least one of the initial set of recommendation candidates to generate the plurality of content recommendation candidates Generating the further content recommendations using the relationship information may comprise applying a mapping to the one or more of the initial content recommendations and/or their associated metadata, wherein the mapping is based on content engagement data for a plurality of users. The mapping may comprise a machine learning derived procedure.

The user data may be stored in a user profile and wherein the content recommendation process is configured to generate recommendation candidates based on a user profile.

The further content recommendation candidates may include at least some of the initial content recommendations.

The method may include providing a final set of recommendation candidates to a user device. The final set of recommendation candidates may include at least some of the initial recommendation candidates and at least some of the further recommendation candidates wherein the method comprises controlling a weighting between the user data and the further user data. Optionally the weighting may be controlled using a balance parameter.

The relationship information may comprise learned relationships between the content items and/or associated metadata.

The relationship information may comprise learned relationships between content items of the available content.

The content engagement data may comprise interaction data representing interactions between the plurality of users and the available content items.

The method may comprise opening a content recommendation session in which one or more content recommendation operations are available to be applied to user data to generate content recommendation candidates and wherein the content recommendation process comprises applying the one or more content recommendation operations to user data to generate the initial set of content recommendation candidates.

The content recommendation process may be further dependent on a parameter indicative of a desired degree of diversity for the one or more further content recommendation candidates relative to one or more initial content recommendation candidates.

Performing the content recommendation procedure may comprise receiving a request over a network for one or more recommendation candidates and sending the generated one or more recommendation candidates as a response over a network, wherein the request and response are received and sent using a predefined application programming interface.

The user data may be stored in a first memory resource remote from the user device, the first memory resource storing user profiles for a plurality of users of a content distribution system; and the content may be stored in a second memory resource remote from the first memory resource, the second memory resource storing items of content for the content distribution system.

In accordance with a fifth aspect there is provided a system comprising processing circuitry configured to: obtain user data for a selected user, wherein the user data comprise or represent content metadata associated with user activity; perform a content recommendation process using the user data and content information for the available content to generate one or more initial content recommendation candidates for the user; generate or otherwise obtain relationship information for the available content items and/or metadata associated with the available content items wherein the relationship information is based on at least content engagement data for a plurality of users of the content distribution system; generate one or more further content recommendation candidates from the initial content recommendation candidates using the relationship information.

In accordance with a sixth aspect, there is provided a non-transitory computer-readable medium that comprises computer-readable instructions that are executable to: obtain user data for a selected user, wherein the user data comprise or represent content metadata associated with user activity; perform a content recommendation process using the user data and content information for the available content to generate one or more initial content recommendation candidates for the user; generate or otherwise obtain relationship information for the available content items and/or metadata associated with the available content items wherein the relationship information is based on at least content engagement data for a plurality of users of the content distribution system; generate one or more further content recommendation candidates from the initial content recommendation candidates using the relationship information.

Features in one aspect may be provided as features in another aspect. For example, method features may be provided as apparatus features and vice versa. For example, any of the features of the first to third aspects may be provided as a feature of the further to sixth aspects.

BRIEF DESCRIPTION

Various aspects of the invention will now be described by way of example only, and with reference to the accompanying drawings, of which:

FIG. 2 is representation of certain database learning tables used by the system of FIG. 1;

FIG. 9 depicts similarity between content items captured in the relationship information;

FIG. 10 depicts example content items and their associated metadata, and

FIG. 11 depicts an example test query using relationship information.

DETAILED DESCRIPTION

In TV systems, or other systems for provision of content to a user, each service provider may have thousand, tens or hundreds of thousands, or millions of customers, wherein each customer is unique and may have different viewing habits and preferences.

Tracking, recording and processing large volumes of customer data together with large amounts of content data within reasonable time constraints and with acceptable accuracy poses a significant technical challenge. The time constraints demanded by particular content providers, or expected by users, may be particularly demanding This can present a significant technical challenge, particularly as the system is usually hosted on one or more servers remote from the set top box or other device and, for systems with millions of subscribers, may have to deal simultaneously with hundreds of thousands of user actions or interactions per minute during busy periods.

Figure 1:
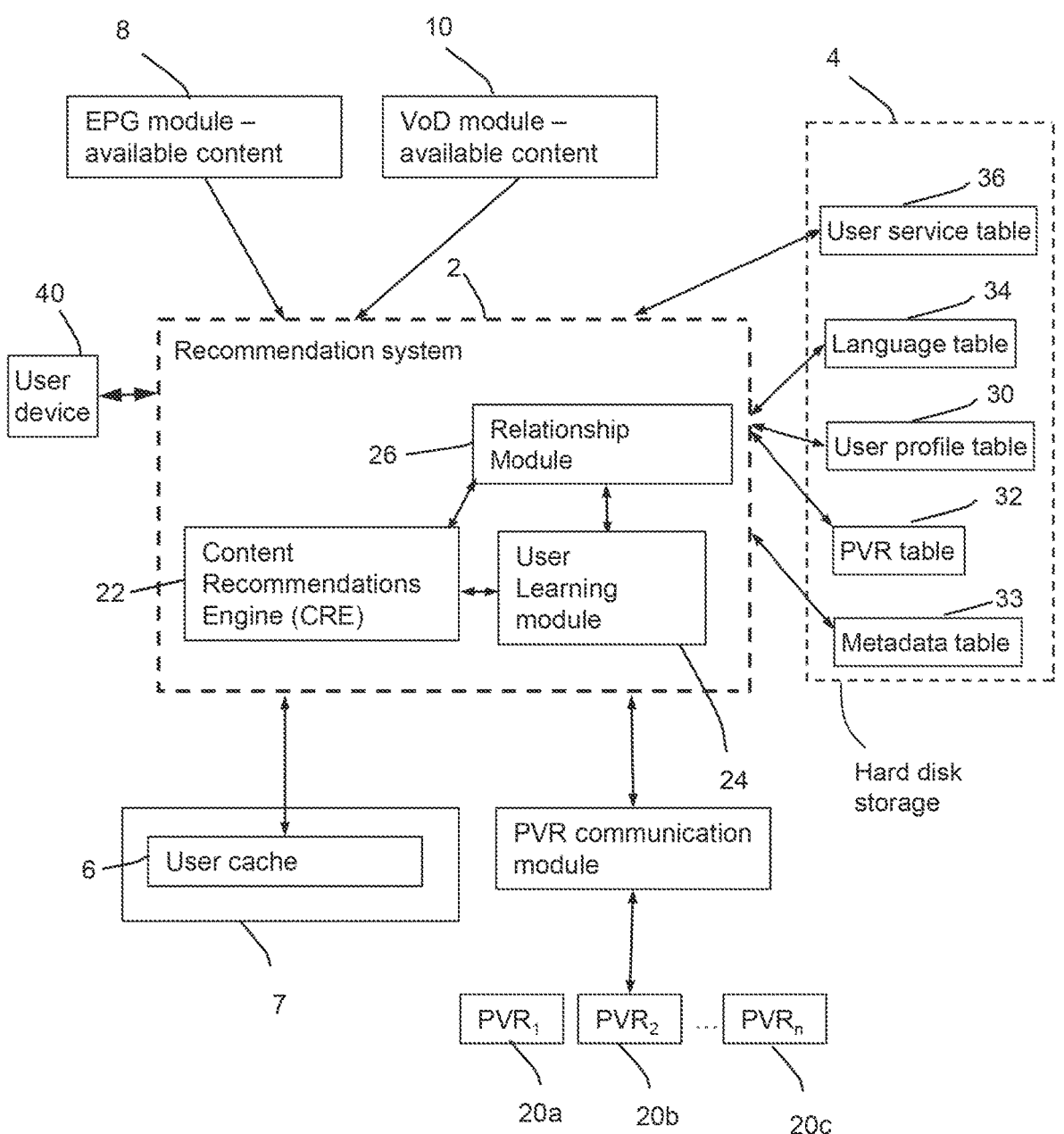
FIG. 1 is a schematic diagram of a digital content recommendation system.

The system of FIG. 1 is able to provide content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated herein by reference.

The following embodiments relates to a system and method of providing content recommendations to users of a content recommendation system, in particular, to provide a set of diverse content recommendations based on user data and associated content item information. As described in the following, the content recommendation system is configured to, in some embodiments, generate or obtain relationship information between different categories associated of content (as a non-limiting example, these categories may include descriptive categories such as genres or sub-genres or any other properties or labels associated with the content). In alternative embodiment, the relationship information relates to relationships between the content items themselves. The content recommendation system is configured to use the relationship information as part of a content recommendation process to generate a diverse set of content recommendations.

It will be understood that, in some embodiments, the content recommendation process uses predetermined content recommendation processes (for example, one or more procedures or algorithms) that are configured to receive a request for a set of recommendations and output content recommendation candidates based on at least user data and content information. Such content recommendation processes may output content recommendation candidates based on performing a matching process or alternative comparing process between user data and content information. Such processes may be accessible using one or more application programming interfaces.

As an example, a so-called preference recommendation is described. A particular user has user data represented as a user record that represents or is indicative of a preference and/or interest for a certain type of content (for example, content of a certain genre, sub-genre, mood or featuring a certain actor) based on historical engagement data with the available content items. The preference and/or user interests are represented by content metadata associated with previous user activity and associated weights. In particular, that content metadata include content metadata items selected from the ontology described elsewhere. The content recommendation process may select one or more content recommendation candidates for the user based on a comparison between the content metadata of the user data and the content metadata (the content information) of the available content items. In this example, the type of content that a user prefers will be recommended. For example, if a user has expressed a preference for a particular sub-genre (i.e. the user data includes highly weighted content metadata for that particular sub-genre) then content items for that sub-genre will tend to be recommended.

In some embodiments, the diverse content recommendation process combines the relationship information with the predetermined content recommendation process to generate a diverse set of recommendations that are different, or at most overlap with a set of recommendations that would be recommended by the process in the absence of the relationship information. For example, by using the relationship information either before or after performing the content recommendation process, the set of recommendation candidates will relate to a different set of content items than the set of recommendation candidates that would be generated without the processing step of using the relationship information.

In general, the method uses user activity and/or engagement data for a plurality of users to identify relationships between different genres/subgenres/categories of content, and then these relationships are used to infer new content for discovery for a given user, in place of or together with their currently learned interests. As a first non-limiting example, for a user with user data representing a set of interests, content that does not exactly match their current interests but instead matches a set of related interests.

In the following embodiments, a diverse set of recommendation candidates are obtained using pre-determined relationship information in a processing step performed either before and/or after and/or during the application of a content recommendation procedure. The diversity of the generated recommendations candidates can be understood with reference to set of recommendation candidates that would be generated in the absence of using the relationship information, for example, without applying the additional processing step that uses the relationship information. step of mapping content items and/or metadata using relationship information.

The diversity of the recommendation candidates may therefore be understood as follows. A first type of recommendation procedure is applied to user data to generate a first set of recommendation candidates without using the relationship information (for example, without the additional step of mapping content items and/or mapping content metadata before, after or during application of a content recommendation procedure). The first set of recommendation candidates may therefore referred to the non-diverse set and correspond to the set of candidates that offer the best match between the content information and the user data. The same type of recommendation procedure together with the application of relationship information (either before, after or during the recommendation procedure) will generate a second set of recommendation candidates. As relationship information has been used the second set of candidates is the diverse set may be referred to the diverse set.

On comparison between the non-diverse and diverse set, the diverse set will match the user data to a lesser degree than the non-diverse set. In some embodiments, the metadata of the content items of the diverse set will match or overlap with the metadata of the user data to a lesser degree than the metadata of the content items of the non-diverse set matches or overlaps with the metadata of the user data. In some embodiments, on a count of matching features between the user data and each set of candidates the diverse set will have fewer matches than the non-diverse set.

In some embodiments, on comparison of the matching features between the sets of candidates and the user data, there may be common metadata categories between the diverse sets and the non-diverse sets. The common metadata categories in the diverse set may have a lower weight (for example, indicating a lower user preference or interest in content with that associated metadata category) than the common metadata categories in the non-diverse set. Alternatively or in addition, the content items of the diverse set may have more metadata items that are not found in the user data than the content items of the non-diverse set. For example, the content items of the diverse set may collectively have more non-matching metadata items compared to the user data than the non-diverse set.

It will be understood that even the non-diverse metadata may include features that do not correspond to or can be found in the user data. The diverse set may have a wider breadth or range of metadata compared to the non-diverse set. This may be determined by processing the metadata of the diverse and non-diverse sets and obtaining a measure of the breadth or range of metadata (for example, based on correlations between different features). In some embodiments, a measure of similarity between the results may distinguish between the diverse and non-diverse set. For example, the content items of the diverse set may be less similar than the non-diverse set (for example, based on having fewer matching or correlated features).

In accordance with an embodiment, relationship information is generated based on at least user engagement data. In some embodiments, relationship information is represented by a set of mappings of features of a set of features that may be present in the user record to further features that may be present in the user record. It will be understood that in the following embodiments, the relationship information corresponds to relationships between metadata items. An embodiment that uses metadata relationship information is described with reference to FIG. 4. It will be understood that content metadata items relate to properties and/or parameter of content items. In some embodiments, the relationship information is derived using content engagement data and includes learned relationships between content items of the available content items. An embodiment that uses content item relationship information is described with reference to FIG. 5.

The relationship information may be derived using a combination of methods, for example, it may be based on applying a machine learning training process on user engagement data. In some embodiments, the relationship information is derived based on a semantic analysis of metadata terms. The relationship information may be derived based on determining similarity between different metadata items, for example, different metadata words. As described with reference to FIG. 8, the relationship information may be captured in a trained neural network, such that the trained neural network represents the relationship information.

In some embodiments, the learned relationship information is mathematically and/or graphically represented as a network graph with a plurality of nodes (or vertices) and edges (or links). In such a representation, the relationships between the 38,000 or so metadata items may be represented as a network. The network allows a definition of distance between the plurality of metadata items. For example, a distance between two metadata items may depend on the number of edges of a shortest path between them. As such, the distance between metadata items may be characterised by the number of edges defined between them in the network. For example, a first metadata item is represented as a node on the network and has a set of nearest neighbours (with a single edge separating them) and then a subsequent set of next to nearest neighbours (with two edges separating them). For each metadata item, the degree of separation defines a further set of related metadata items. For each metadata item, multiple nodes will be connected from one node.

It will be understood that the length of the edge between two content items may correspond due to weights such that while some content items may be the same number of edges apart, their distance may be different.

In some embodiments, the mapping is based on a machine learning procedure configured to receive a parameter representing the distance and/or degree of separation. In some embodiments, that parameter is also learned and stored for each user so that each user has a preferred or desired degree of separation. The desired degree of separation may be the degree of separation that results in the most diverse recommendations for that user or may be the degree of separation that results in the greatest customer engagement with the results.

It will be understood that the mappings generate alternative content metadata that are different to the original metadata of the user data. The initial metadata of the user data includes a number of metadata items, also referred to as user profile features. The alternative content metadata includes a distinct set of metadata items, also referred to as discovery features. It will be understood that the alternative content metadata will be different and distinct from the content metadata of the user data. The alternative content metadata may partially overlap with the content metadata of the user data.

Based on the derived relationship information, a mapping from a particular metadata item to a further metadata item can be defined for generating further sets of metadata items based on a desired degree of separation. Thus using the relationship information allows a set of mappings from the user record to a further user record to be defined. As described in the following, in some embodiments, the user records is mapped to a further user record and the content recommendation is based on the user record.

In some embodiments, the application of the mapping may be dependent on a desired degree or separation from the metadata item. For example, it may be desired to generated well separated metadata items for a content recommendation process to provide a more diverse set of recommendation candidates. In such embodiments, the generation of the alternate content metadata is dependent on a distance or separation parameter. For example, in embodiments in which the relationship information is represented by a discrete graph, the parameter is a discrete separation parameter representing the separation between the initial content metadata features and the desired content metadata features. This parameter may be, for example, a positive integer value. For example, a value of 0 would return the original metadata features. A value of 1 would return metadata features that are a single edge from the original metadata features and a value of 2 would return metadata features that are two edges from the original metadata features, etc.

The relationship information thus allows a set of mappings from the user record to a further user record to be defined. As described in the following, in some embodiments, the user record is mapped to a further user record and the content recommendation is based on the further user record.

Figure 5:
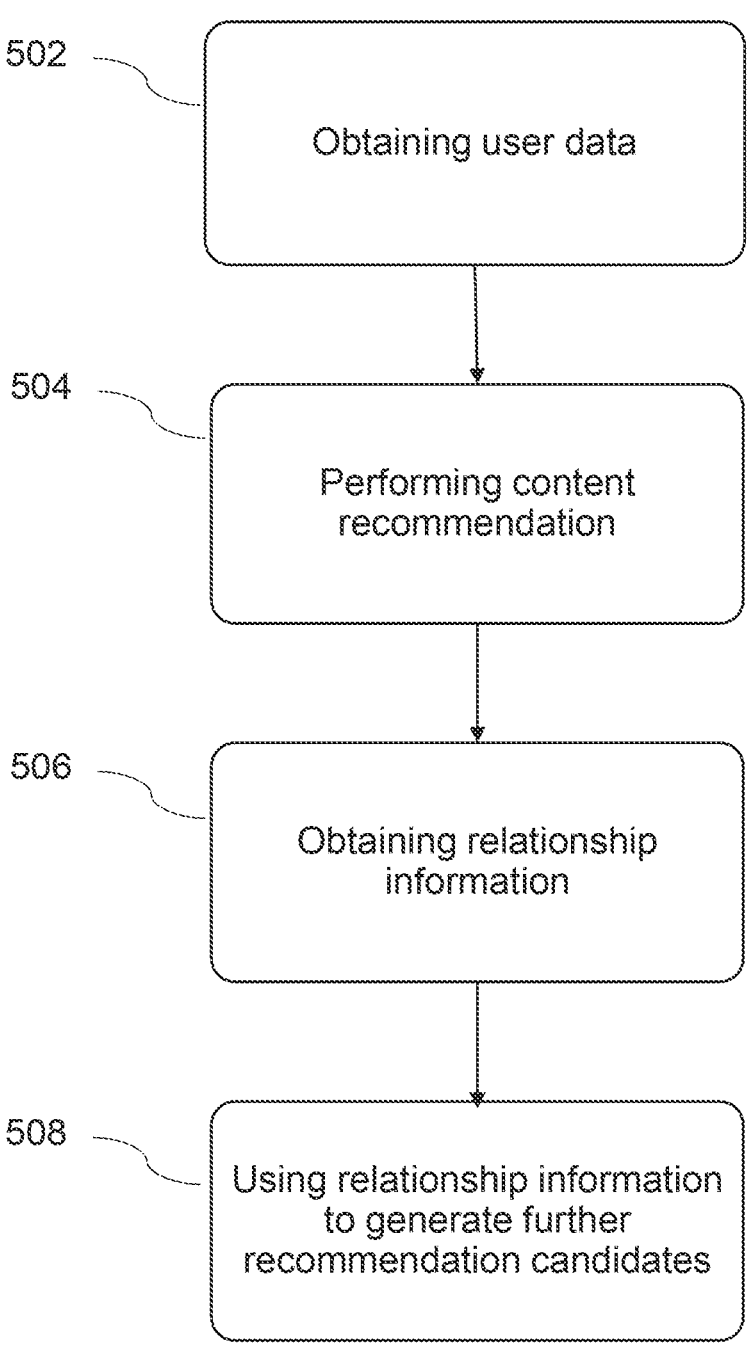
FIG. 5 is an overview of a method of generating content recommendations using relationship information in accordance with a further embodiment.

While the above description relates to distances/separations between metadata features, it will be understood that a similar representation can be used for relationship information between content items themselves, for example, with reference to the method of FIG. 5. In such an embodiment, the relationship information is represented as network between the available content items where the nodes are the content items and the edges represent connections between content items themselves. As described above, a definition of separation between content items is represented by the network allowing a desired degree of separation to be requested. The network allows a definition of distance between two content items. For example, a measure of distance may correspond to the number of edges in a shortest path between them. For example, a first metadata item is represented as a node on the network and has a set of nearest neighbours (with a single edge separating them) and then a subsequent set of next to nearest neighbours (with two edges separating them). For each metadata item, the degree of separation defines a further set of related metadata items.

While described with reference to an embodiment for generating further content recommendations based on a first set of content recommendations, the relationship information for the content items may be used to define a degree of separation for the candidates of other embodiments (for example, for the candidates returned using discovery features, as described with reference to FIG. 4). This information provides a quantitative measure of diversity to be returned by the system.

In some embodiments, the application of the relationship information or mapping is iterative such that results that are a single degree of separation (a single step) are returned for each iteration. In such an embodiment, the mapping is applied to a first discrete item (either a metadata item or a content item depending on the application) of the network, and generates a first set of results that are one step from the first discrete item. A second iteration is then applied to a selected one of the items of the first set of results to generate a second set of results that are one step away from the selected item. The second iteration may be applied to all of the items of the first set or to a subset. Likewise, the first iteration may be applied to more than one item. In this way, the iterative mapping allows related items to be generated using the relationship information.

FIG. 1 shows a schematic diagram of content recommendation system according to an embodiment, which is operable to generate content recommendations for users based on first party data in the form of, for example, user actions performed in relation to their selection, viewing and other actions in relation to TV content provided by a TV distribution system, and/or in relation to other content. The content recommendation system is configured to perform one or more content recommendation methods, in accordance with embodiments, including the methods described with reference to FIGS. 4 and 5.

Content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated herein by reference.

Some example modes of operation are described below in relation to PVRs associated with users, but content may be provided or accessible via any suitable devices, for example set-top boxes, smartphones, PCs or tablets or any other suitable content delivery mechanism.

The system in the embodiment of FIG. 1 comprises a content recommendation system 2 that comprises a content recommendation engine (CRE) or module 22 and linked to a first storage resource in the form of a hard disk storage device 4, which is used to store various user data. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, the recommendation system is able to communicate, either directly or indirectly, and either via wired or wireless connection, with very large numbers of users or user devices and to provide recommendations for or derived from such users or user devices. Other than some PVRs which are shown schematically in FIG. 1, only a single user device 40 is shown in FIG. 1 for clarity.

The recommendation system 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, the recommendation system 2, the User Cache 6, the PVR Communication module 12, the EPG module 8 and the User Learning module 24 are implemented in a server. The server includes communication circuitry that enables communication between the server, or appropriate components of the server, with each of the user devices, and with the content sources, for example a TV service operator or other content service operator.

Any other suitable implementation of the EPG module 8, the VoD module 10, the recommendation system 2, the CRE 22, the user cache 6, the PVR communication module 12, the EPG module 8 and the user learning module 24 may be provided in alternative embodiments, for example they may be implemented in any software, hardware or any suitable combination of software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the system, such that additional metadata to that provided by the content sources or other external sources may be stored.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments further sources of content as well as or instead of those shown may be used.

The operation of the digital content recommendation system is controlled by the recommendation system 2. As can be seen in FIG. 1, the recommendation system 2 is configured to communicate with the one or more content information modules: the electronic programme guide (EPG) module and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20a, 20b, . . . 20z and the recommendation system 2.

The recommendation system 2 has a content recommendation engine (CRE) 22, a relationship information module 26 and a user learning module 24. The CRE 22 can apply a set of processes or procedures to determine, in real time, content recommendations for a user based on user data and available content.

The user learning module 24 receives data indicative of selections or other actions by a user and builds up a set of user data, for example comprising or representing a user history or profile, which is stored in the hard disk storage 4, and which is used in generating personalised recommendations for the user.

FIG. 1 shows a user action being received by the recommendation system 2. In addition to receiving requests for recommendation, the recommendation system 2 is configured to log user activity. By logging user activity and storing activity over an extended period of time, the recommendation system 2 and the hard disk storage 4 can build up an overall picture of the viewing activities, habits and preferences of a plurality of users. User actions are turned into learn actions by the user learning module 24 to be processed the content recommendation engine 22.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user cache 6 is coupled to the relationship information module 26 and the content recommendations engine 22, and data stored by the user cache 6 may be used by the relationship information module 26 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the relationship information module 26 to generate and/or update relationship information, and by the CRE 22 to generate content recommendations. In the embodiment of FIG. 1 a set of database tables is provided that store information concerning the users.

In the embodiment of FIG. 1, the tables may include at least one user service table 36 that represent user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1 it can be understood that a large part of the user data comprises user history or user action data that represent user actions over a significant period of time.

In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of a FIG. 1, a distinction is made between different types of user and different sets of the tables are stored for the different types of users.

FIG. 2 is a representation of certain database learning tables stored on the hard disk storage resource 4 of the embodiment of FIG. 1. The system supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of individuals associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer or subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed.

For each user of all categories, there may be separate groups of learning tables. In FIG. 2, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table 32 stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value; feature ratings; content source ID; client type ID; series title of content tem and content item instance identifier. A flag is also stored to indicate if a recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

It can be understood from the description above concerning user learn actions that in a system with a large number of users, user data may be generated almost continuously as users watch programmes and perform other actions. Such user data is stored in the hard disk storage 4.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 for a particular user.

It is a feature of the embodiment of FIG. 1 and at least some other embodiments that during a session for a particular user, the user data for that user may change or be added to. For example, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the recommendation system 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences. As discussed, a minimum event time filter may be implemented to ensure that short period events are not recorded and/or used. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a session for that user is updated, based on the learn actions for the user occurring during the session, on an ongoing basis. Thus, the user data for a user stored in RAM 7 may change during a session for the user, such that processes are performed based on the most up-to-date user data.

In the embodiment of FIG. 1, the user data for a user is overwritten by the user data stored in RAM 7 (which may be more up-to-date) in response to the end of a session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider. The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: $PV_1$, $PV_2$, . . . , $PV_n$. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of $PVR_1$ and user of $PVR_2$ may have recorded or downloaded the same content item or series of content items. Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20a, 20b, . . . 20z and the recommendation system 2. The recommendation system 2 collects identifying information relating to the content items stored on the PVRs 20a, 20b, . . . 20z. Content items from the PVR of the user can then be taken into consideration in generating content recommendations.

In alternative embodiments any other data stores, for instance local storage devices, for example any storage devices included in or associated with user devices, may be used as well as or instead of PVRs. In some embodiments the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

There is description above concerning metadata or other content information that may be used by the system. Content information may, for example, include contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

Figure 3:
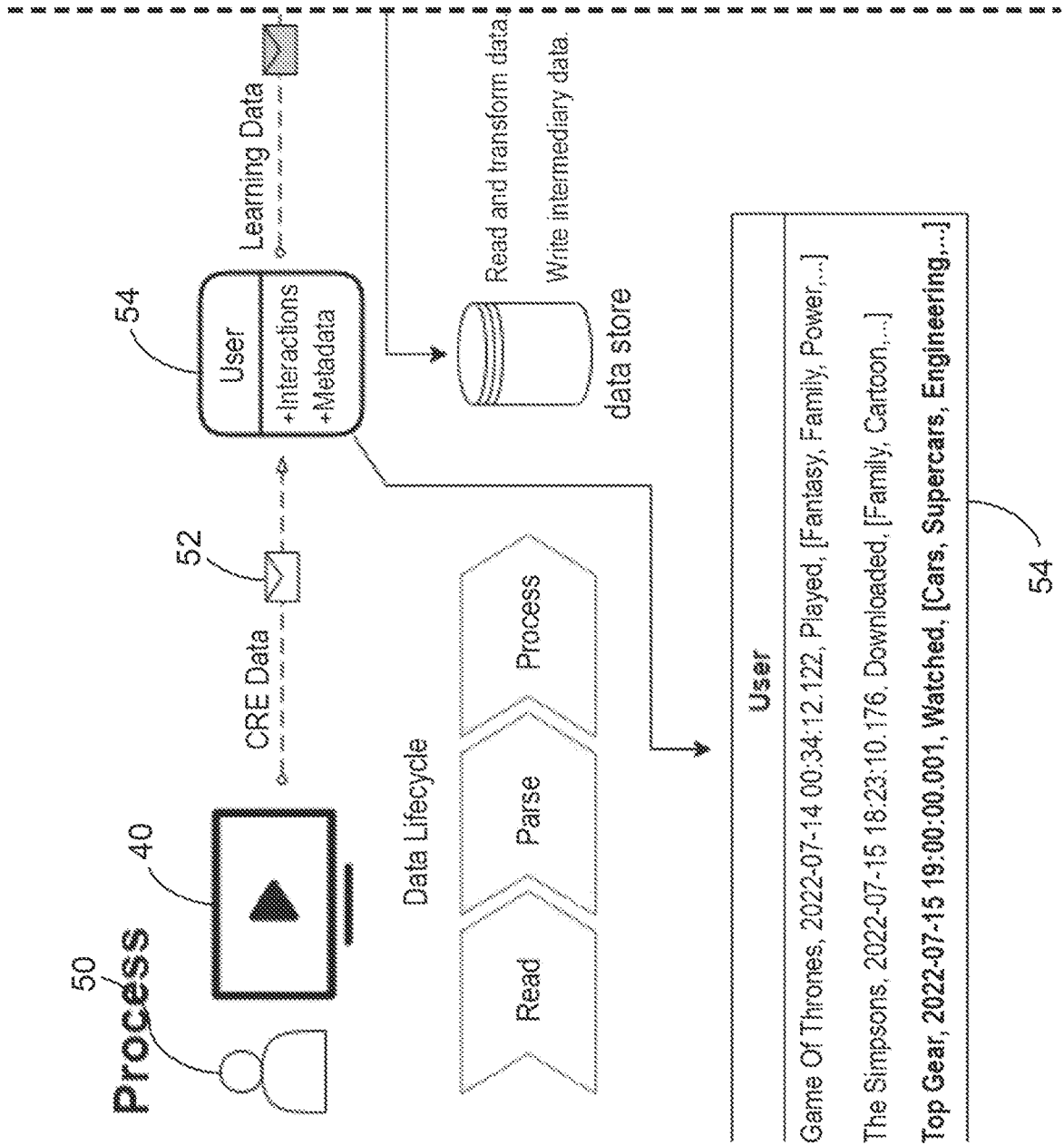
FIG. 3 is a schematic illustration of the generation of user records and relationship information using the system of FIG. 1.
Figure 3:
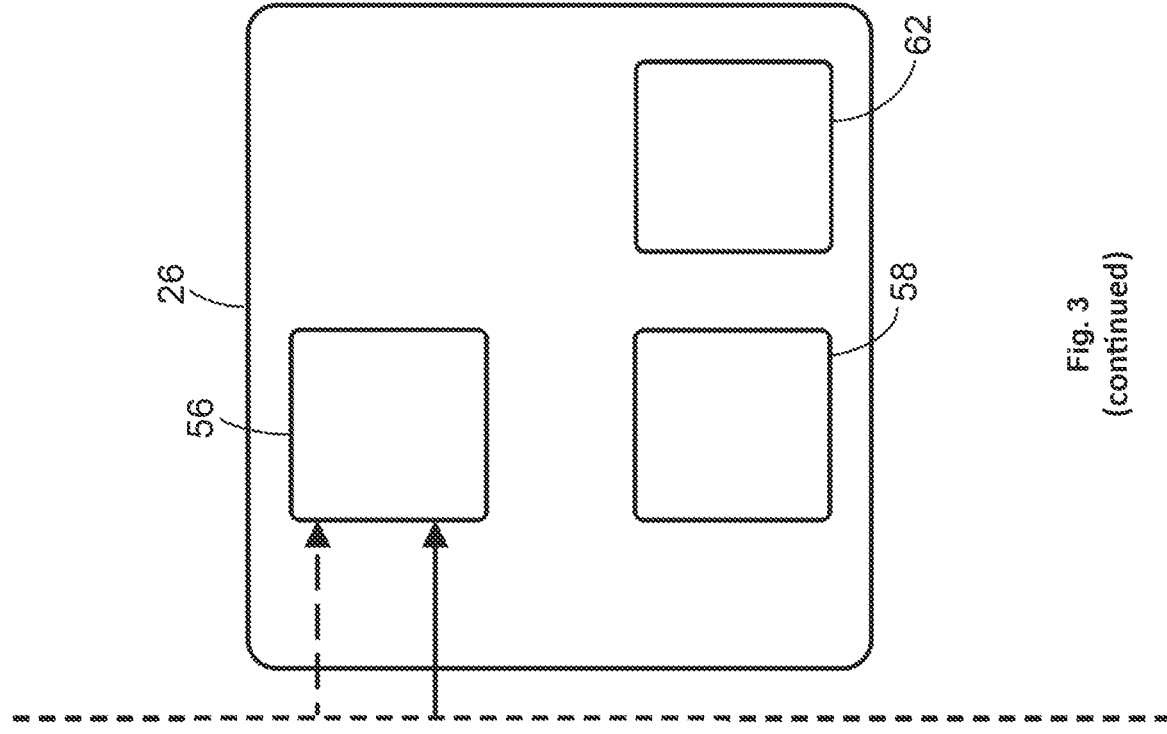

FIG. 3 is a schematic overview of the operation of the content recommendation engine. As part of a session, the content recommendation engine is configured to offer a number of operations to be called using an API. As an example, the content recommendation engine is configured to offer to content recommendation request FIG. 3 shows a user 50 watching a television programme that they have selected on user device 40. Data 52 representing the user's activity is sent to the recommendation system 2 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record for the user.

A user record 54 for the user is illustrated schematically in FIG. 3. An expanded version of at least part of the user record is also shown in FIG. 3 for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIG. 3. For example, at least the meta data items cars, supercars and engineering are associated with the Top Gear episode. In practice there will be many more items of meta data associated with each item of content.

In general, a user record 54 will include records of far larger numbers of items of content than shown for the purposes of illustration in FIG. 3. However, such a small number of items content might be found for a new user or for a temporary user of a system. For example in some embodiments, the system may be used for a user who is a guest in a hotel or traveller in a vehicle or transport system.

The user data in respect of the user 50 is sent to the content recommendation engine 22 in order to generate or update a user profile for the user 50.

The content recommendation module 22 in this embodiment then performs a search of various data sources 56, for example in the cloud, to determine any other information concerning the item of content. For example, various databases can be consulted that include additional information concerning television programmes or other items of content.

In the present embodiment, the record for the item of content and any other information found from the search of data sources 56 is subject to processing by sub-module 58 that match the meta data and other information for the item of content to an ontology of meta data terms that are maintained by the system. Thus, the meta data for the item of content can be enriched, corrected or supplemented.

In the present embodiment the ontology consists of around 38,000 features that can be used as meta data to represent items of content. The ontology defines features in the format <context>:<keyword>. Features describe the content and include subjects, settings, themes and characters (for example, Wimbledon may contain the terms—subject: tennis, sports competition: Wimbledon, theme: sports). Any other suitable ontology can be used in other embodiments. In some embodiments, no ontology is used and the raw metadata associated with the item of content (for example, provided by the content maker, distributor or broadcaster) is used without amendment or enrichment.

The metadata for the item of content is stored in the user record in the hard disk storage 4. In the system, the metadata is stored on hard disk storage in metadata table 33.

As described above, each user has a stored user record or user profile. The system is configured to provide a plurality of content recommendation candidates to a user based on the similarity between the user record and the content metadata.

Operation of the system of FIGS. 1 and 3 is described in the following. As a first stage, the user 50 initialises a viewing session through a first initiation event. An initiation event can, for example, be a user logging on to a service provider or turning on the user device. The initiation event is communicated to the content recommendation module 2 via a communication channel between the user device 40, for example a set top box or other device, for example at the user's home or other remote location, and the content recommendation module 2. In the embodiment of FIG. 1 there is direct communication between the user device 40 and the content recommendation module 2. In alternative embodiments, communication between the user device 40 and the content recommendation module 2 is mediated or passes through, for example a content provider, for instance a TV system operator to which the user subscribes. The initiation event may be treated automatically by the content recommendations module as being a request for recommendations for the user.

In response to the initiation event, the user is then presented, via a display of the user device 40, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information as part of a content recommendation process. The content recommendation process is performed in accordance with embodiments, for example, as described with reference to FIGS. 4 and 5.

Once the CRE 22 has performed the content recommendation process, the content recommendation(s) generated by the CRE 22 are then transmitted to the user device 40 either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation(s) may be transmitted in any suitable fashion either to the user device, or to the database, server or other device. In the present embodiment, software installed at the user device 40 determines whether or how the content item recommendation are displayed on the user interface.

It can be understood that the time constraints on providing content recommendations can be significant, given that personalised content recommendations may need to be generated on the fly, particularly as it may be necessary to provide personalised content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM user data for said plurality of the users substantially simultaneously. For example, user data may be maintained in the RAM 7 for thousands, hundreds of thousands or even millions of users substantially simultaneously, depending on the RAM storage capacity available and the number of subscribers or other users associated with the system.

At the start of a content recommendation session for a user the user data, including all of the various table entries, for the user, are read from the hard disk storage 4 and stored in the user cache 6 in RAM 7, or any other suitable local or rapidly readable storage resource in alternative embodiments. Throughout the content recommendation session the user data stored in the user cache 6 in RAM 7 is used by the CRE 22 to generate content recommendations for the user. This can provide a significant time saving compared to having to read the user data from the hard disk storage 4 each time a content recommendation is needed during the session. At the expiry of a session, the user data for the user is deleted from the cache. The expiry of the session may occur for example in response to no user actions have been received for a pre-determined time period, in response to a user logging off a session or switching off a user device, or in response to loss of communication with the user device. If a new content recommendation session for the user subsequently begins, the user data is read again from the hard disk storage 4 and stored in the user cache 6 in RAM 7.

There is description above concerning metadata or other content information that may be used by the CRE 22 in providing content recommendation. Content may be made available to the content recommendations engine 22 in some embodiments. The content information can contain scheduling information (e.g. start and end times for programmes, series information) together with content information regarding the programme itself (e.g. programme description, age rating information).

As described above, the recommendation system 2 has a content recommendation engine (CRE) 22, a relationship information module 26 and a user learning module 24.

In operation, the relationship module 26 is configured to load or access a mapping procedure 62, for example stored on hard disk storage 4 or other networked resource. The mappings procedure applies a mapping to an input based on a store of relationship information, as described in the following.

In some embodiments, the relationship module 26 loads a mapping file that stores the relationships between all content items. However, due to the large number of metadata items and therefore the large number of relationships between them, the file may be prohibitively large. This may also cause time delays to the recommendation process due to the time taken to access the desired information. Therefore, in the present embodiment, the mapping procedure is based on a machine learning model that represents learned relationships between metadata items. In the present embodiment, the procedure is configured to input one or more metadata items to a model and output one or more related metadata items based on the relationship information. In some embodiments, the machine learning model is trained to include a desired degree of separation or distance in the input such that the output is based on the desired degree of separation or distance.

In some embodiments, the mappings procedure relates/maps metadata items from the ontology (e.g. the ontology of 38,000 items) to other metadata items in the ontology. Weightings or confidence scores are associated with the mappings in some embodiments. The ontology represents a pre-determined set of properties and/or parameters. The content metadata for content items (or as collected in user data) corresponds to properties and/or parameters selected or assigned weights and/or values from this pre-determined set. The at least one property of the piece of content may comprise a set of tags or other metadata representing properties of an item of content.

In some embodiments, the mappings procedure relates/maps content items from the available content items (for example, from modules 8 and 10) to further content items (for example, from modules 8 and 10). Weightings or confidence scores are associated with the mappings in some embodiments.

In some embodiments, the mappings procedure relates/maps metadata items from the ontology directly to content items. In practice, for users with a reasonably lengthy viewing history the user record for the user will be representative of many items of content that the user has viewed or otherwise interacted, and the user profile will therefore be indicative of a wider range of user interests and preferences.

As part of a content recommendation session, a number of different types of recommendation process are available to be requested. Any suitable content recommendation process may be used, for example based on a weighting, scoring and/or matching process generated based on previous user actions, and matching to available content. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation process can be more sophisticated and, may be for example based on similarities or cross-correlations between different content parameters and user actions and properties based on large amounts of historical data. In contrast to obtaining recommendation candidates based on the best match between user profile features and content metadata, the described embodiments are intended to offer a diverse set of content item recommendations for a user to discover new content that they would otherwise not be exposed to. At least one of the recommendation procedures/processes may use a machine learning derived model to determine recommendation candidates. As a non-limiting example, machine learning techniques such as clustering algorithms for clustering objects that share similarities, such as K-means clustering or neural network based techniques and/or Kohonen based techniques may be suitable.

The content metadata may correspond to values for one or more properties or parameters or characteristics, such as programme title, time, duration, content type, programme categorisation, actor names, genre, release data, episode number, series number, style, mood, language and theme. The properties or parameters or characteristic may include one or more of the following: Audience; Award; Category; Character; Character Type; Concept Source; Director; Format; Franchise; Host; Mileu; Mood; Producer; Person; Subcategory; Scenario; Setting; Sports Competition; Studio; Style; Subject; Team; Theme; Time Period; Writer. These properties or parameters will be understood as a non-exhaustive and non-limiting list. The metadata is represented by metadata items having a value for such properties or parameters. The collected metadata can be considered as representative of user interests and/or preferences based on previous interactions with the content. The metadata items may be provided together with a score so that the metadata represents a degree of the preference or interest for that content property or parameter.

The initial content metadata may be referred to as user profile features and the generated content metadata may be referred to as discovery features.

Figure 4:
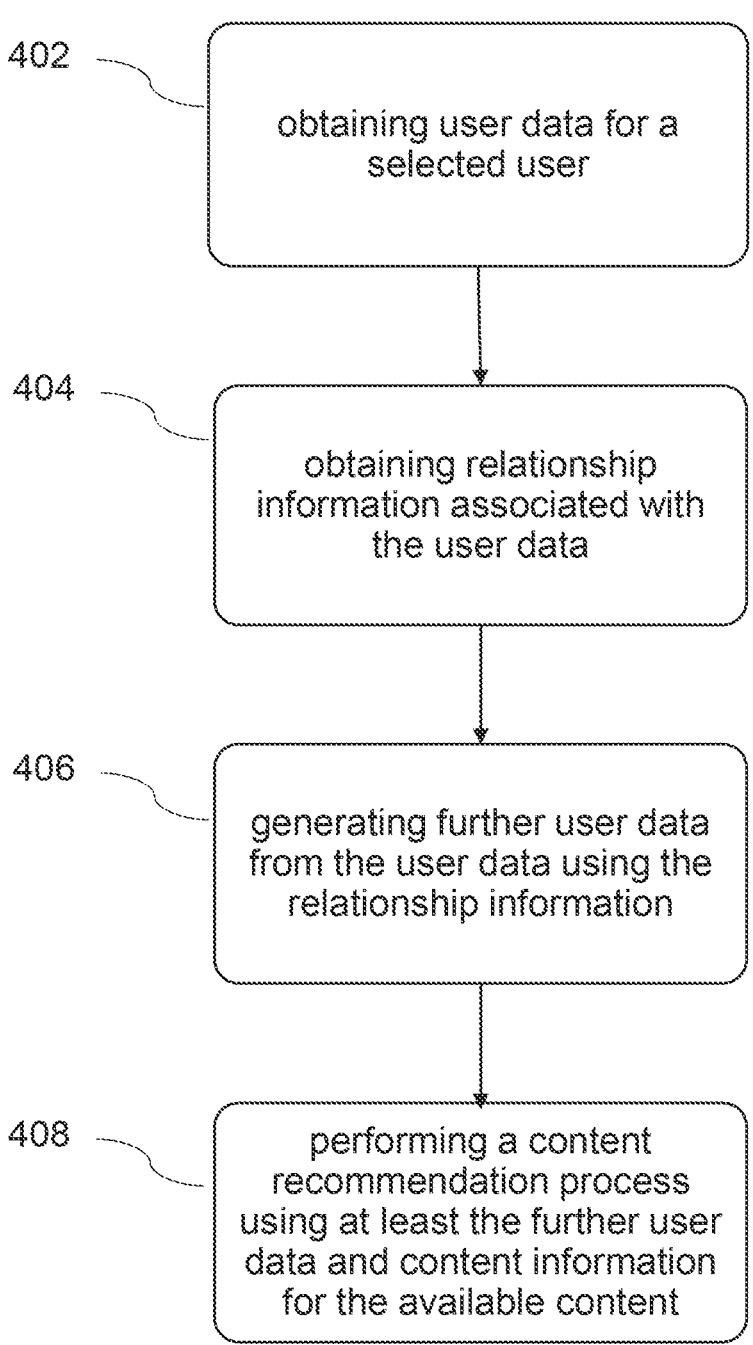
FIG. 4 is an overview of a method of generating content recommendations using relationship information in accordance with an embodiment.

Operation of the content recommendation system to provide the content recommendations process according to the process of FIG. 4 is now described. In the following embodiments, content requests such as those described above are combined with relationship information to provide a diverse set of recommendations to the user. In the following description, a content recommendation session has been commenced, as described above.

At step 402, user data for a selected user is obtained. In the present embodiment, the user data is stored in the user record and the user record is obtained. As described with reference to FIG. 3, the user data stored in the user record represents user activity and content metadata associated with user activity.

At step 404, relationship information is obtained. In the present embodiment, the relationship information is a set of relationships between features of the user record, in particular between content metadata features. Such features represent properties or parameters of content that has been viewed or engaged with in the past. As described above, the relationship information provides a mapping between content metadata associated with user activity and alternative content metadata. The alternative content metadata is therefore not based on the user activity but on relationships between metadata features. In the present embodiment, the relationships information is provided as a machine learning derived procedure based on a trained model that provides a mapping from a set of features to a further set of features.

At step 406, the relationship information is used to obtain further user data from the initial user data. In the present embodiment, step 402 includes applying the machine learning derived procedure to the content metadata to generate the alternative content metadata of the further user data.

At step 408, the obtained further user data, in this embodiment, the modified user record as part of a content recommendation request. The content recommendation is based on, for example, a weighting, scoring and/or matching process based on the modified user record and matching to the available content. The output of the content recommendation process is a set of one or more recommendation candidates.

It will be understood that, by using the generated further data, in particular, the alternative content metadata obtained using the relationship information, a diverse or alternative set of recommendation candidates are generated as described above. For example, the generated candidates are diverse and/or different relative to the set that would generated if the recommendation process was performed in the absence of the relationship information, for example, if performed on the initial user data.

In the above described embodiments, a process in which further user data is used. As described above, the generated further user data is different to the initial user data i.e. represents a different set of metadata properties or parameters and/or user preferences or interests than the set of the initial user data. In some embodiments, it may be desirable to use a combination of initial user data and further user data to generate the recommendation candidate set. In such embodiments, a parameter is selected to determine the balance of user data (user profile features) and further user data (discover features). The parameter may be referred to as a discovery or diversity parameter.

The discovery parameter allows a degree of discovery to be defined for the content recommendation process. For example, in a non-limiting example, the discovery parameter may be a value between 0 and 1 such that for a "0" value no discovery features are used for the recommendation, such that the content recommendation corresponds to a content recommendation performed only on the initial user data and also such that for a "1" value only discovery features are used for the recommendation.

A value of "0.5" for example, would allow equal user profile and discovery features to be used so that the content recommendation results include a combination of content recommendation candidates that match the user profile and content recommendation candidates that are related. A balance may be preferred to avoid providing the user with too much diverse content. It will be understood that the discovery parameter may be used together with the distance/separation parameter described elsewhere. In some embodiments, the discovery and distance/separation parameter, described elsewhere are combined into a single discover parameter.

In some embodiments, the discovery and user profile features may be combined based on a parameter of the received request or based on the time available to provide the request. For example, the parameter may indicate the number of discovery features to be obtained which are then combined with the original user features.

It will be understood that recommendation request procedures with different degrees of discovery may be defined as separate API methods. For example, a new API method may be provided that corresponds to a 100% discover recommendation (i.e. the data used to generate the content metadata includes only the discovery features). Such an API call may be a wrapper over the methods described above with the discovery parameter set to a value corresponding to the maximum degree of discovery. A separate API method may offer advantages to a use-case designer in that it may allow them to define the degree of discovery in terms of the returned results rather than in the request.

Operation of the content recommendation system of FIGS. 1 and 3 to provide the content recommendations according to the process of FIG. 5 is now described. In the following embodiments, a content recommendation request is combined with relationship information to provide a diverse or different set of recommendations to the user.

At step 502, user data for a selected user is obtained. In the present embodiment, the user data is stored in the user record and the user record is obtained. As described with reference to FIG. 3, the user data stored in the user record represents user activity and content metadata associated with user activity.

At step 504, the obtained user data is used, together with content information for the available content, as part of a content recommendation request to generate a first set of content recommendation candidates. The content recommendation is based on, for example, a weighting, scoring and/or matching process based on the user record and content metadata for the available content. The output of the content recommendation process is a first set of one or more recommendation candidates.

At step 506, relationship information is obtained. In the present embodiment, the relationship information is a set of relationships between content items. As described above, such relationship information is derived using content engagement data for a plurality of users. As described above, the relationship information provides a mapping between content items. In the present embodiment, the relationships information is provided as a machine learning derived procedure based on a trained model that provides a mapping from a set of features to a further set of features.

At step 508, the relationship information is used to obtain a further set of recommendation candidates from the first set of recommendation candidates. In the present embodiment, step 408 includes applying the machine learning derived procedure to the first set of recommendation candidates to generate the further set of recommendation candidates.

The final set of recommendation candidates returned by the method may a mixture of the initial set and the further set. A balance parameter may allow for the balance between initial set and further set to be controlled thus allows a desired degree of discover to be achieved. For example, the parameter may be a value between 0 and 1 where 0 represents that the final set only includes the initial set and 1 represents that the final set should only includes the second set. A value between 0 and 1 reflect the desired degree or ratio of second to initial recommendation candidates in the final set.

In addition or alternatively, the final results of the method of FIG. 5 may be dependent on a desired degree of distance or separation. The desired degree of separation may be achieved when applying the relationship information such that content items that are a nth level of separation from the initial content recommendations are provided in the second set of candidates. Alternatively, as described above, in some embodiments the application of the mapping(s) is an iterative process and the parameter relates to the number of iterations of mappings that are applied.

In the method of FIG. 5, relationship information concerning relationships between content items were used to generate further recommendation candidates. In a further embodiment, the relationship information may relate metadata items (as described above) to content items such that further recommendation candidates can be generated from the initial set based on their metadata rather than using direct content to content connections. In such embodiments, the metadata of the first set of recommendations are extracted from the candidates and the relationship information is applied to at least some of the extracted metadata.

In the method of FIG. 4 or 5, the recommendation candidates may be intermediate recommendation candidates or may be the final recommendations provided to the user. For example, in the method of FIG. 5, the recommendation candidates may be provided to one or more further procedures or operations, for example, a sorting/filtering/ranking operation or, for example, a further operation that applies external constraints on the results.

As an non-limiting example, a first approach may use the initial user data to generate a first set of recommendation candidates. The first set of recommendation candidates may be subjected to an external constraint, for example, a constraint that takes into account a legal or a business requirement. The relationship mappings may then be applied to the constrained results to generate a further set of recommendation candidates. A second approach may use the initial user data to generate a first set of recommendation candidates and then use the relationship information to generate a further set of recommendation candidates before applying the external constraint.

It will be understood that, by applying relationship information to the first set of recommendation candidates, the second set of generated recommendation candidates are different to the initial set of generated recommendation candidates.

Figure 6:
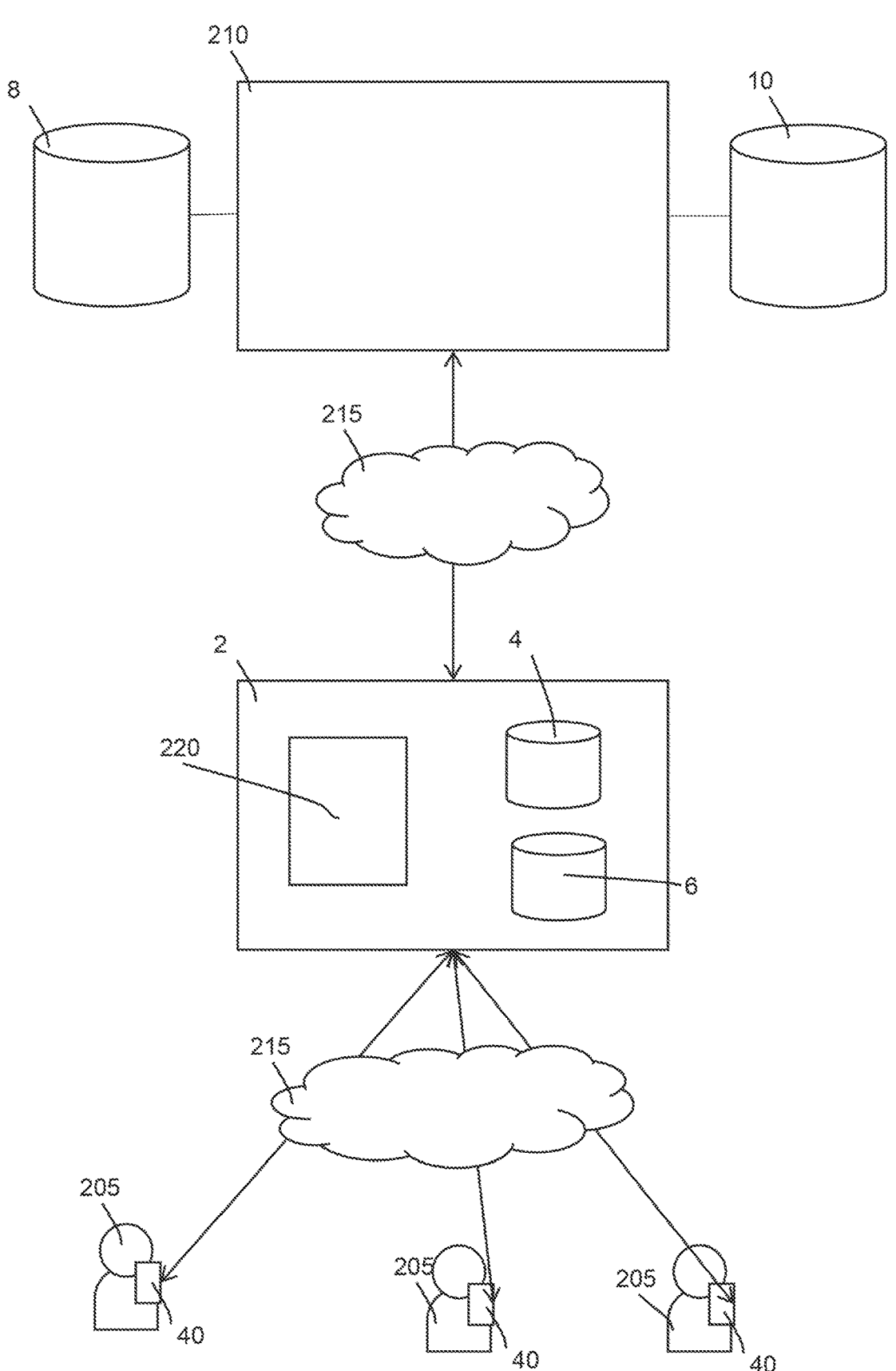
FIG. 6 is a schematic of the system of FIG. 1.

Although a particular system arrangement is shown in FIG. 1, there are various system arrangements that could be used. For example, FIG. 6 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Figure 7:
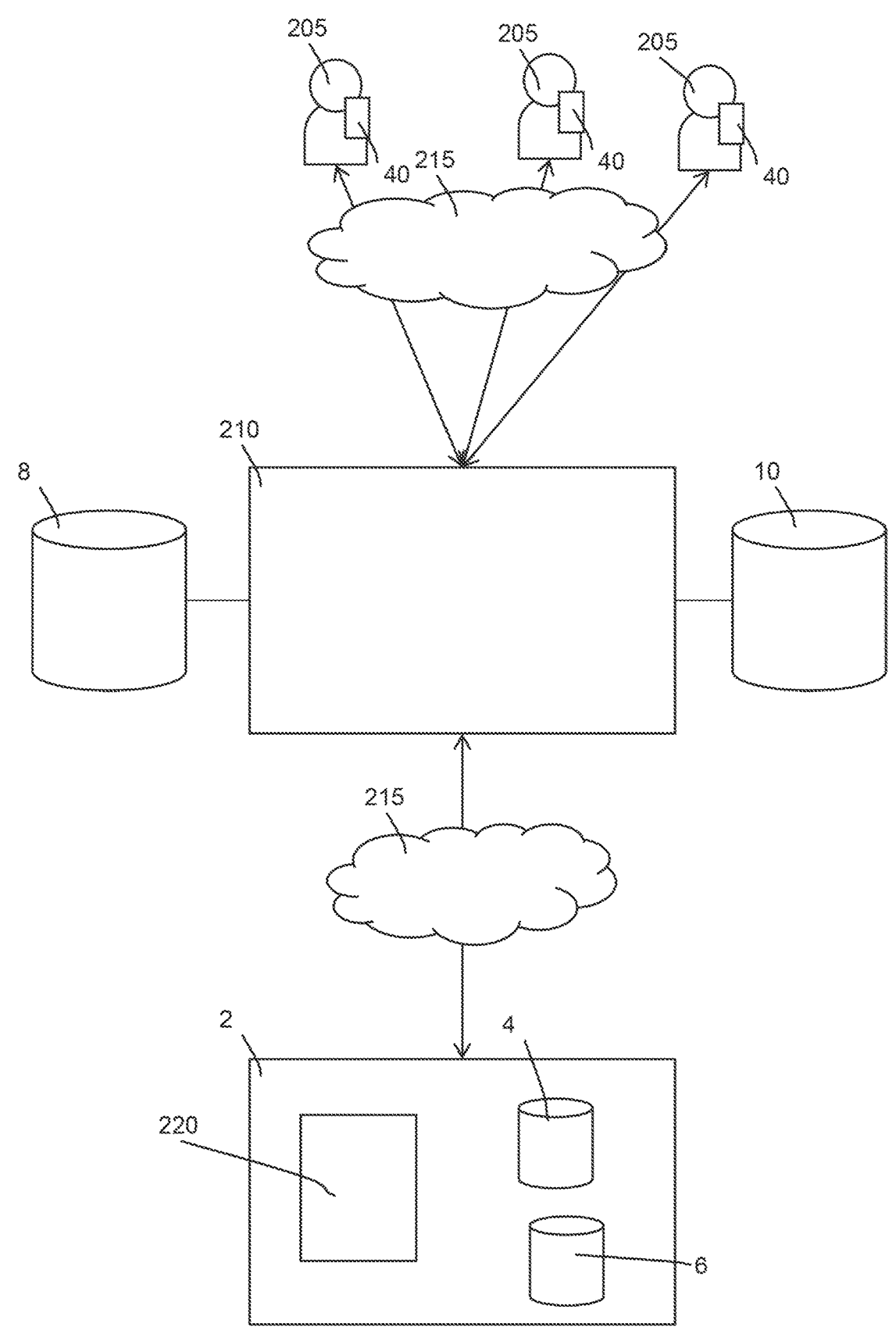
FIG. 7 is a schematic of an alternative system arrangement to that of FIG. 6.

Other system arrangements that provide similar functionality to customize the content selection interfaces for users are possible. FIG. 7 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

As described above, the relationship information may be obtained using a number of different methods. In some embodiments, the relationship information is obtained using embedding based machine learning techniques. Embedding techniques may be used in natural language processing (NLP) tasks. Word embeddings may be used in NLP to represent words as dense vectors in a lower-dimensional space, where semantically similar words are mapped to similar vectors. Embedding may be sued to represent user data or content items, in a lower-dimensional space. By computing the similarity between the embedding vectors of users and items, the recommendation system can generate personalized recommendations for users. Each element of the input data is mapped to a vector in the embedding space, so that semantically similar elements are mapped to similar vectors. This allows the model to capture the meaning and context of words in a meaningful way.

Figure 8:
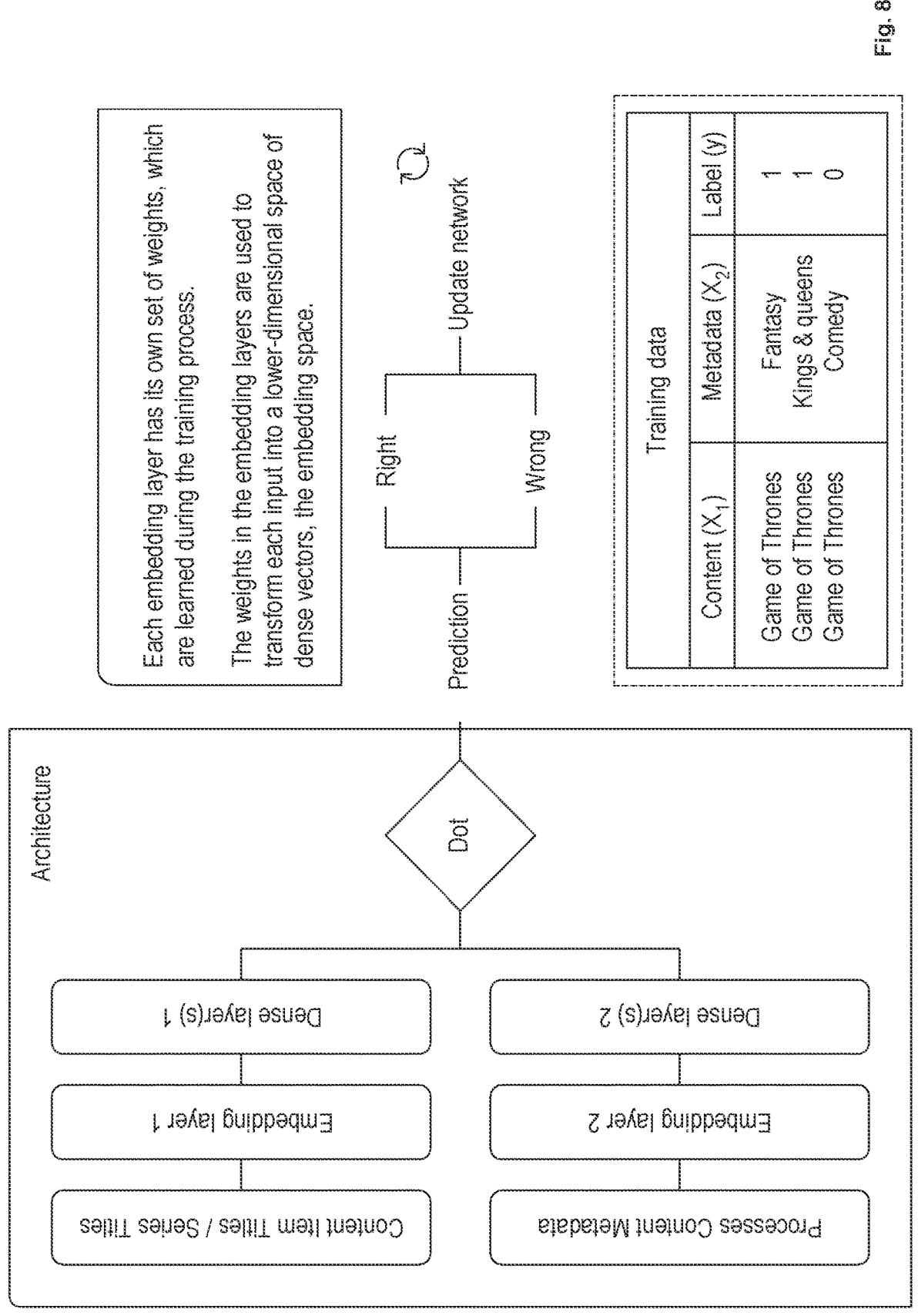
FIG. 8 is a schematic of an overview of a method of obtaining relationship information.

FIG. 8 depicts an overview of a method of obtaining the relationship information. In further detail, FIG. 8 depicts an architecture for an embedding based API. In the embodiment of FIG. 8, the relationship information is captured in a neural network. FIG. 8 depicts a method of training a neural network to obtain relationship information.

In further detail, FIG. 8 depicts two embedding layers that represent content and their metadata respectively. Each asset (for example, a content item) and its associated metadata are mapped to dense vectors in an embedded space using their respective embedding layers. The output from the embedding layer is then passed to a dense layer. The dot product layer then computes the dot product of the two vectors to measure their similarity.

During training, the neural network learns to adjust the weights of the embedding layers, the dense layers, and the dot product layer so that the dot product output is high for matching content-metadata pairs (labelled as 1) and low for non-matching content-metadata pairs (labelled as 0). Dense layers help introduce non-linearity using different activation functions, with the goal of capturing more complex relationships within the input data. It will be understood that input data includes at least user engagement data.

Example training data is shown in FIG. 8, however, it will be understood that each content item will have a much larger number of associated metadata items. In this embodiment, the training data is based on user content engagement data.

Figure 9:
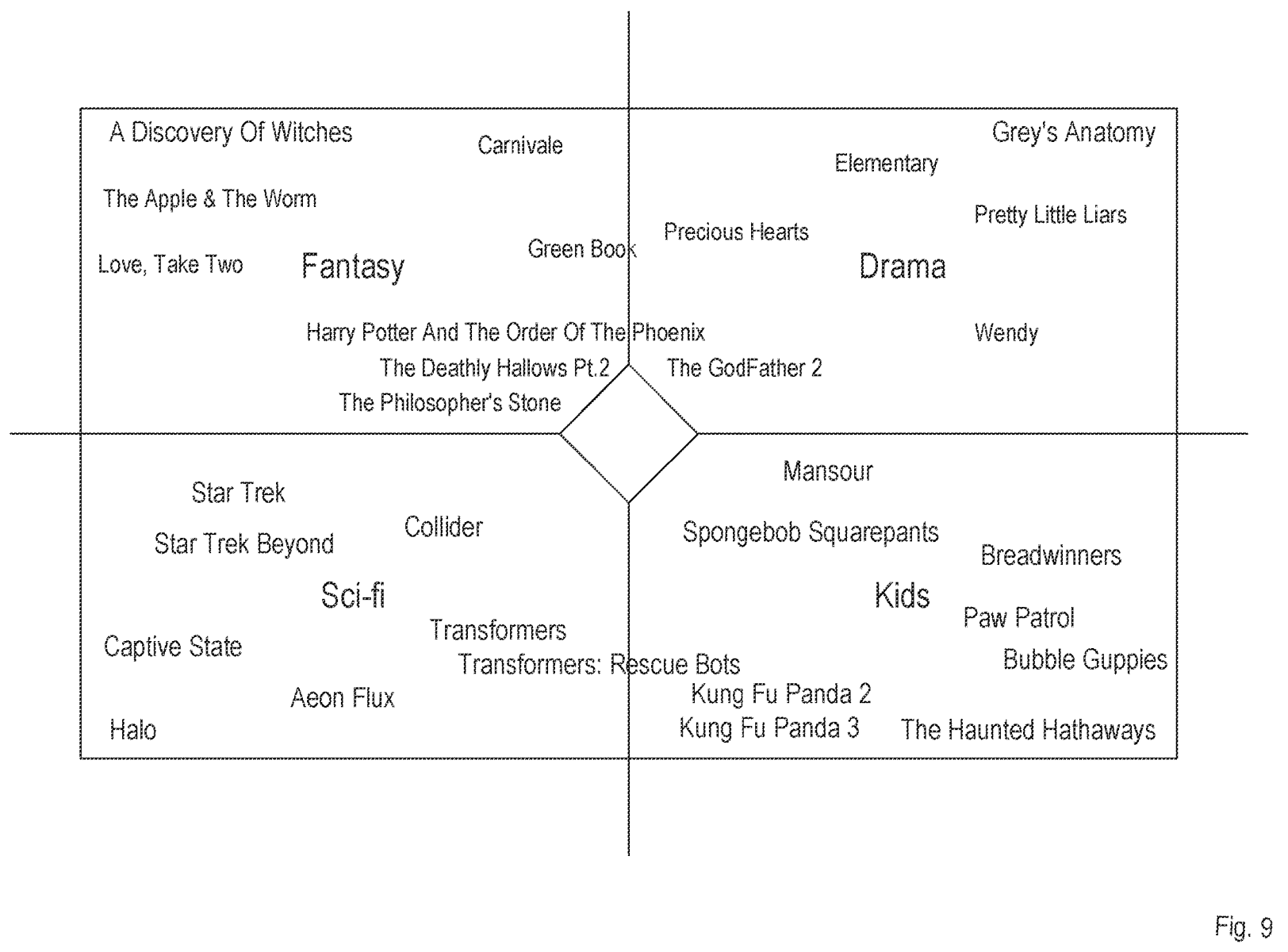

FIG. 9 depicts similarity between content items captured in the relationship information. The plot of FIG. 9 represents four genres of content: Fantasy, Drama, Sci-Fi and Kids together with content items for each genre.

FIG. 10 depicts content and associated metadata for each genre of FIG. 9. FIG. 10 depicts recommendations generated using relationship information applied to content recommendation candidates.

FIG. 11 depicts results from a first test query. A first example test query asks for titles closest to a user set including "Terminator Genisys", "Star Trek Beyond", Star Trek Into Darkness". The system returns content items together with their similarity score based on the relationship information.

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language to be used by the recommendations engine 22 when checking for previously recommended items. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

In the embodiment of FIG. 1 recommendations of items of content may be provided based on data concerning items of content of the same type (for example video content, such as movies, TV programmes or other video content), and/or based on user data representing previous consumption of, or actions relating to, content of the same type (for example video content, such as movies, TV programmes or other video content). It will be understood that video content may include associated audio content, for example an associated soundtrack.

In alternative embodiments, recommendations are generated by the CRE 22 for content items of one type based on content information or user actions concerning content of another type. The different types of content may comprise, but are not limited, to video content (for example, movies, TV programmes or other video content), audio content (for example, music, podcasts, talking books), computer games, books, magazines, other printed content, live performances such as concerts, plays, comedy performances or sporting events.

For example, if user data stored for a user, for example in the hard disk 4, indicates that a user has bought tickets or attended a live performance, for example of a musical act or sports team, then the CRE 22 may use that user data in the content recommendation process, which may increases the likelihood that the CRE 22 will recommend a movie or TV programme or other content concerning that musical act or sports team.

Similarly, if user data stored for a user, for example in the hard disk 4, indicates that the user has read or purchased a particular book then the CRE 22 may use that user data in the content recommendation process, which may increases the likelihood that the CRE 22 will recommend a movie or TV adaptation of that book or of other books by the same or similar authors or relating to the same or similar genres (for example, action, crime, romance, etc).

In some embodiments, the content recommendation based on user actions or preferences concerning content of one type may comprises recommendations of more than one type of content. For example, a content recommendation may be based on user actions or preferences in relation to TV programmes, but the content recommendation may comprise recommendations of one or more TV programmes and, in addition, one or more items of another type of content.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

The above description of specific embodiments is made by way of example only. A skilled person will appreciate that variations of the described embodiments may be made without departing from the scope of the invention.

What is claimed is:

1. A computer-implemented method for obtaining one or more recommendation candidates for items of content available via a content distribution system, the method comprising:

obtaining user data for a selected user from a storage resource, wherein the user data represent user activity and comprises content metadata associated with user activity;

generating or otherwise obtaining relationship information for at least some content metadata associated with the available content, wherein the relationship information is based on at least content engagement data for a plurality of users of the content distribution system, the relationship information comprises learned relationships between a plurality of metadata items associated with the available content items, wherein the relationship information is represented as a first machine learning model;

generating further user data from the user data using the relationship information so that the further user data comprises or represents alternative content metadata that are distinct or at most overlap with the content metadata associated with the user activity, wherein generating said further user data using the relationship information comprises applying the first model to the content metadata of the user data to obtain the alternative content metadata; and performing a content recommendation process, in response to receiving a request from a user device, using at least the further user data and content information for the available content to generate one or more content recommendation candidates for the user, wherein the content recommendation request is based on a second machine learning model and performing the content recommendation process comprises applying the second machine learning model to at least the further user data to obtain the one or more content recommendation candidates.

2. The method of claim 1, wherein the content metadata comprises one or more properties obtained or selected from a predetermined set of properties and wherein the relationship information comprises information about relationships between said predetermined set of properties and wherein the alternative content metadata comprises one or more alternative properties obtained and/or selected from the predetermined set of properties.

3. The method of claim 1, wherein performing the content recommendation process using the user data would generate a reference set of candidates and wherein at least one of:

a) the generated set of candidates matches with the user data to a lesser degree than the reference set;

b) the generated set of candidates has more metadata or metadata items that are not associated with the user activity than the reference set;

c) the metadata that is common between the generated set and the reference set of candidates has a lower associated weight for the generated set than for the reference set.

4. The method as claimed in claim 1, further comprising monitoring user activity including identifying content selected for viewing by the user of the user device and generating or updating the user data using metadata associated with the selected content wherein the content metadata of the user data is associated with selected items, and wherein the alternative content metadata is obtaining using relationship information.

5. The method of claim 1, wherein the metadata represents and/or is indicative of one or more properties comprise content parameters, properties and/or characteristics, such as programme title, time, duration, content type, programme categorisation, actor names, genre, release data, episode number, series number, style, mood, language and theme.

6. The method of claim 1 wherein the content metadata are selected from a predetermined set of properties that comprises a stored ontology that includes at least 10,000 features that can be used as meta data to represent items of content, optionally, wherein the ontology includes enriched versions of metadata obtained for items of content.

7. The method of claim 1, wherein the relationship information includes distance and/or separation information for the content metadata associated with the available content, and wherein the method comprises selecting a desired degree of distance or separation and generating the further user data based on the desired degree of distance or separation.

8. The method of claim 1, wherein the user data represent or are indicative of user preferences and/or user interests associated with and/or derived based on user activity and wherein the generated further user data is representative of user interests and/or preferences that are different to or at most overlap with the one or more selected user interests and/or preferences.

9. The method of claim 1, wherein the user data comprises or is based on user action data representing previous user actions, optionally content selection, viewing or recording actions, user language data and/or episode data and/or rating data and/or content metadata representing properties of content viewed, recorded or selected by a user.

10. The method of claim 1, wherein generating the further user data using the relationship information comprises applying a mapping to the one or more properties associated with the content, wherein the mapping is based on content engagement data for a plurality of users.

11. The method of claim 1, wherein generating the further user data using the relationship information comprises applying an iterative mapping process to the user data to iteratively generate alternative content metadata.

12. The method of claim 1, wherein the user data is stored in a user profile and wherein the content recommendation process is configured to generate recommendation candidates based on the user profile, wherein generating the further user data further comprise performing a user profile expansion and/or modification process on the user profile using the relationship information to generate an expanded user profile using at least the alternative content metadata and wherein the method comprises using the expanded user profile to generate the content item recommendation.

13. The method of claim 1, wherein the recommendation process is based on a combination of the user data and the further user data and wherein the method comprises controlling a weighting between the user data and the further user data.

14. The method of claim 1, wherein the relationship information comprises learned relationships between a set of predetermined categories in the user data, wherein the learned relationship are derived based on at least one on content engagement data.

15. The method of claim 1, wherein the content recommendation process is further dependent on a parameter indicative of a desired degree of diversity for the generated one or more content recommendation candidates for the user relative to one or content recommendation candidates generated using the user data and wherein the content recommendation process.

16. The method of claim 1, wherein performing the content recommendation operation comprises receiving a request over a network for one or more recommendation candidates and sending the generated one or more recommendation candidates as a response over a network, wherein the request and response are received and sent using a predefined application programming interface.

17. A system comprising processing circuitry, a storage resource and a user device, wherein the processing circuitry is configured to:

obtain user data for a selected user, wherein the user data represent content metadata associated with user activity;

generate or otherwise obtain relationship information for at least some content metadata associated with the available content wherein the relationship information is based on at least content engagement data for a plurality of users of the content distribution system, wherein the relationship information comprises learned relationships between a plurality of metadata items associated with the available content items, wherein the relationship information is represented as a first machine learning model;

generate further user data from the user data using the relationship information so that the further user data comprises or represents alternative content metadata that are distinct or at most overlap with the content metadata associated with the user activity, wherein generating said further user data using the relationship information comprises applying the first model to the content metadata of the user data to obtain the alternative content metadata; and perform a content recommendation process, in response to receiving a request from a user device, using at least the further user data and content information for the available content to generate one or more content recommendation candidates for the user, wherein the content recommendation request is based on a second machine learning model and performing the content recommendation process comprises applying the second machine learning model to at least the further user data to obtain the one or more content recommendation candidates.

18. A non-transitory computer-readable medium that comprises computer-readable instructions that are executable to perform a method according to claim 1.

\* \* \* \* \*